US012282646B2

(12) United States Patent
Patel et al.

(10) Patent No.: US 12,282,646 B2
(45) Date of Patent: *Apr. 22, 2025

(54) NETWORK RESOURCE LOCATION LINKING AND VISUAL CONTENT SHARING

(71) Applicant: Snap Inc., Santa Monica, CA (US)

(72) Inventors: Imran Patel, Venice, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,724

(22) Filed: Mar. 6, 2023

(65) Prior Publication Data

US 2023/0205399 A1    Jun. 29, 2023

Related U.S. Application Data

(63) Continuation of application No. 16/596,469, filed on Oct. 8, 2019, now Pat. No. 11,599,241, which is a
(Continued)

(51) Int. Cl.
*G06F 3/0482* (2013.01)
*G06F 3/04842* (2022.01)
(Continued)

(52) U.S. Cl.
CPC ........ *G06F 3/0482* (2013.01); *G06F 3/04842* (2013.01); *G06F 16/955* (2019.01);
(Continued)

(58) Field of Classification Search
CPC .. G06F 3/0482; G06F 3/04842; G06F 16/955; G06F 40/169; G06T 1/0007; H04L 51/046; H04L 51/08; H04N 21/4788
See application file for complete search history.

(56) References Cited

U.S. PATENT DOCUMENTS

| 666,223 A | 1/1901 | Shedlock |
| 4,581,634 A | 4/1986 | Williams |
(Continued)

FOREIGN PATENT DOCUMENTS

| CA | 2887596 A1 | 7/2015 |
| EP | 2051480 A1 | 4/2009 |
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
(Continued)

OTHER PUBLICATIONS

"A Whole New Story", Snap, Inc., [Online] Retrieved from the Internet: <URL: https://www.snap.com/en-US/news/>, (2017), 13 pgs.
(Continued)

*Primary Examiner* — Daniel Samwel
(74) *Attorney, Agent, or Firm* — Schwegman Lundberg & Woessner, P.A.

(57) ABSTRACT

Systems, devices, media, and methods are presented for transmitting shared visual content between networked devices with a linked source for the visual content by accessing and presenting visual content, receiving a network location for a network resource associated with the visual content, linking the network location to the visual content to generate linked visual content, and cause presentation of the linked visual content in a draft message within a graphical user interface.

20 Claims, 17 Drawing Sheets

Related U.S. Application Data continuation of application No. 14/954,138, filed on Nov. 30, 2015, now Pat. No. 10,474,321.

(51) Int. Cl.
  *G06F 16/955* (2019.01)
  *G06F 40/169* (2020.01)
  *G06T 1/00* (2006.01)
  *H04L 51/046* (2022.01)
  *H04L 51/08* (2022.01)
  *H04N 21/4788* (2011.01)

(52) U.S. Cl.
  CPC .......... *G06F 40/169* (2020.01); *G06T 1/0007* (2013.01); *H04L 51/046* (2013.01); *H04L 51/08* (2013.01); *H04N 21/4788* (2013.01)

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 7,984,484 | B1 * | 7/2011 | Rakowski ............... H04L 51/00 726/3 |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,090,351 | B2 | 1/2012 | Klein |
| 8,098,904 | B2 | 1/2012 | Ioffe et al. |
| 8,099,109 | B2 | 1/2012 | Altman et al. |
| 8,112,716 | B2 | 2/2012 | Kobayashi |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,195,203 | B1 | 6/2012 | Tseng |
| 8,199,747 | B2 | 6/2012 | Rojas et al. |
| 8,208,943 | B2 | 6/2012 | Petersen |
| 8,214,443 | B2 | 7/2012 | Hamburg |
| 8,234,350 | B1 | 7/2012 | Gu et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,546 | B1 | 1/2013 | Dollard |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |

(56) References Cited

U.S. PATENT DOCUMENTS

| | | |
|---|---|---|
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,417,765 B1 | 8/2016 | Lewis et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,779,065 B1 | 10/2017 | Lee |
| 9,854,219 B2 | 12/2017 | Sehn |
| 10,474,321 B2 | 11/2019 | Patel et al. |
| 2001/0032335 A1 | 10/2001 | Jones |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0104944 A1 | 6/2004 | Koay et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0125827 A1 | 6/2006 | Adereth et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233661 A1 | 10/2007 | Sayuda |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0005091 A1* | 1/2008 | Lawler .................. G06F 16/283 |
| 2008/0022329 A1 | 1/2008 | Glad |
| 2008/0025701 A1 | 1/2008 | Ikeda |
| 2008/0032703 A1 | 2/2008 | Krumm et al. |

(56) References Cited

U.S. PATENT DOCUMENTS

| | | |
|---|---|---|
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168050 A1* | 7/2008 | Reyes ............... G06F 3/038 707/999.005 |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0209010 A1* | 8/2008 | Zitnick, III ............ H04L 67/06 709/219 |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0115430 A1 | 5/2010 | Skirpa |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0246487 A1* | 10/2011 | Malec ............... G06Q 50/00 707/E17.014 |
| 2011/0246502 A1* | 10/2011 | Aguera y Arcas ..... G06F 16/43 707/769 |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |

(56) References Cited

U.S. PATENT DOCUMENTS

| | | |
|---|---|---|
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0134593 A1 | 5/2012 | Becker |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0031449 A1 | 1/2013 | Griffiths et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0093833 A1 | 4/2013 | Al-Asaaed et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0259308 A1 | 10/2013 | Klusza et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0059419 A1* | 2/2014 | Devries ............... G06F 16/951 |
| | | 715/233 |
| 2014/0082651 A1 | 3/2014 | Sharifi |
| 2014/0086483 A1* | 3/2014 | Zhang ............... G06V 30/1448 |
| | | 382/165 |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0010235 A1* | 1/2015 | Copsey ............... G06V 30/40 |
| | | 382/182 |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |

(56) References Cited

U.S. PATENT DOCUMENTS

| | | | |
|---|---|---|---|
| 2015/0116529 A1 | 4/2015 | Wu et al. | |
| 2015/0169827 A1 | 6/2015 | Laborde | |
| 2015/0172534 A1 | 6/2015 | Miyakawa et al. | |
| 2015/0178260 A1 | 6/2015 | Brunson | |
| 2015/0222814 A1 | 8/2015 | Li et al. | |
| 2015/0261917 A1 | 9/2015 | Smith | |
| 2015/0312184 A1 | 10/2015 | Langholz et al. | |
| 2015/0350136 A1 | 12/2015 | Flynn, III et al. | |
| 2015/0365795 A1 | 12/2015 | Allen et al. | |
| 2015/0378502 A1 | 12/2015 | Hu et al. | |
| 2016/0006927 A1 | 1/2016 | Sehn | |
| 2016/0014063 A1 | 1/2016 | Hogeg et al. | |
| 2016/0085773 A1 | 3/2016 | Chang et al. | |
| 2016/0085780 A1* | 3/2016 | Lew | G06F 16/9535 707/711 |
| 2016/0085863 A1 | 3/2016 | Allen et al. | |
| 2016/0099901 A1 | 4/2016 | Allen et al. | |
| 2016/0103876 A1* | 4/2016 | Bakir | G06F 40/143 707/722 |
| 2016/0149956 A1* | 5/2016 | Birnbaum | G06F 21/10 726/1 |
| 2016/0180887 A1 | 6/2016 | Sehn | |
| 2016/0182422 A1 | 6/2016 | Sehn et al. | |
| 2016/0182875 A1 | 6/2016 | Sehn | |
| 2016/0239248 A1 | 8/2016 | Sehn | |
| 2016/0277419 A1 | 9/2016 | Allen et al. | |
| 2016/0321708 A1 | 11/2016 | Sehn | |
| 2016/0334972 A1 | 11/2016 | Cheng et al. | |
| 2016/0350953 A1* | 12/2016 | Mittelstaedt | H04L 51/043 |
| 2017/0006094 A1 | 1/2017 | Abou Mahmoud et al. | |
| 2017/0046314 A1* | 2/2017 | Chitta | G06F 16/954 |
| 2017/0061308 A1 | 3/2017 | Chen et al. | |
| 2017/0139879 A1* | 5/2017 | Sharifi | G06F 9/4843 |
| 2017/0262139 A1 | 9/2017 | Patel et al. | |
| 2017/0287006 A1 | 10/2017 | Azmoodeh et al. | |
| 2020/0034013 A1 | 1/2020 | Patel et al. | |

FOREIGN PATENT DOCUMENTS

| | | |
|---|---|---|
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2017095800 A1 | 6/2017 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 14/954,138, Final Office Action mailed Jul. 11, 2018", 21 pgs.

"U.S. Appl. No. 14/954,138, Non Final Office Action mailed Dec. 12, 2017", 16 pgs.

"U.S. Appl. No. 14/954,138, Notice of Allowability mailed Sep. 18, 2019", 2 pgs.

"U.S. Appl. No. 14/954,138, Notice of Allowance mailed Jul. 1, 2019", 7 pgs.

"U.S. Appl. No. 14/954,138, Response Filed Mar. 21, 2018 to Non Final Office Action mailed Dec. 12, 2017", 16 pgs.

"U.S. Appl. No. 14/954,138, Response filed Dec. 20, 2018 to Final Office Action mailed Jul. 11, 2018", 13 pgs.

"U.S. Appl. No. 16/596,469, 312 Amendment filed Jan. 6, 2023", 7 pgs.

"U.S. Appl. No. 16/596,469, Final Office Action mailed Jan. 13, 2022", 29 pgs.

"U.S. Appl. No. 16/596,469, Non Final Office Action mailed Apr. 11, 2022", 30 pgs.

"U.S. Appl. No. 16/596,469, Non Final Office Action mailed May 27, 2021", 27 pgs.

"U.S. Appl. No. 16/596,469, Notice of Allowance mailed Oct. 7, 2022", 9 pgs.

"U.S. Appl. No. 16/596,469, PTO Response to Rule 312 Communication mailed Feb. 8, 2023", 2 pgs.

"U.S. Appl. No. 16/596,469, Response filed Apr. 6, 2022 to Final Office Action mailed Jan. 13, 2022", 11 pgs.

"U.S. Appl. No. 16/596,469, Response filed Aug. 11, 2022 to Non Final Office Action mailed Apr. 11, 2022", 10 pgs.

"U.S. Appl. No. 16/596,469, Response filed Sep. 27, 2021 to Non Final Office Action mailed May 27, 2021", 10 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell the Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report mailed Sep. 29, 2015", 2 pgs.

"International Application Serial No. PCT/US2016/063981, International Preliminary Report on Patentability mailed Jun. 14, 2018", 8 pgs.

"International Application Serial No. PCT/US2016/063981, International Search Report mailed Feb. 22, 2017", 4 pgs.

"International Application Serial No. PCT/US2016/063981, Written Opinion mailed Feb. 22, 2017", 6 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RGOw>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

(56) References Cited

OTHER PUBLICATIONS

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Cemerlang, P, et al., "Towards Automatic Mobile Blogging", Proceedings / 2006 IEEE International Conference on Multimedia and Expo (ICME), Ontario, CA, (Jul. 9, 2006), 4 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, a Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

U.S. Appl. No. 14/954,138 U.S. Pat. No. 10,474,321, filed Nov. 30, 2015, Network Resource Location Linking and Visual Content Sharing.

U.S. Appl. No. 16/596,469 U.S. Pat. No. 11,599,241, filed Oct. 8, 2019, Network Resource Location Linking and Visual Content Sharing.

\* cited by examiner

NETWORK RESOURCE LOCATION LINKING AND VISUAL CONTENT SHARING

CLAIM OF PRIORITY

This application is a continuation of and claims the benefit of priority of U.S. patent application Ser. No. 16/596,469, filed on Oct. 8, 2019, and issued as U.S. Pat. No. 11,599,241, which is a continuation of and claims the benefit of priority of U.S. patent application Ser. No. 14/954,138, filed on Nov. 30, 2015, and issued as U.S. Pat. No. 10,474,321, each of which are hereby incorporated by reference herein in their entireties.

TECHNICAL FIELD

Embodiments of the present disclosure relate generally to processing, storing, and transmitting electronic messages. More particularly, but not by way of limitation, the present disclosure addresses systems and methods for automatically detecting a network resource location for a portion of message content and linking the network resource location to the portion of message content within a graphical user interface.

BACKGROUND

Telecommunications applications and devices can provide communication between multiple users using a variety of media, such as text, images, sound recordings, and/or video recording. These applications may transfer message content between two users. Information describing a source for the message content, aspects of the message content, or commentary relating to the message content is transferred in separate messages distinct from the message content being shared. Where the message content is being transmitted in a first application and the source, aspects, or commentary relating to the message content originates in a second application, telecommunications applications rely on device operating system functions such as copy and paste to copy the source, aspects, or commentary from the second application to the first application.

BRIEF DESCRIPTION OF THE DRAWINGS

Various ones of the appended drawings merely illustrate example embodiments of the present disclosure and should not be considered as limiting its scope.

Figure 1:
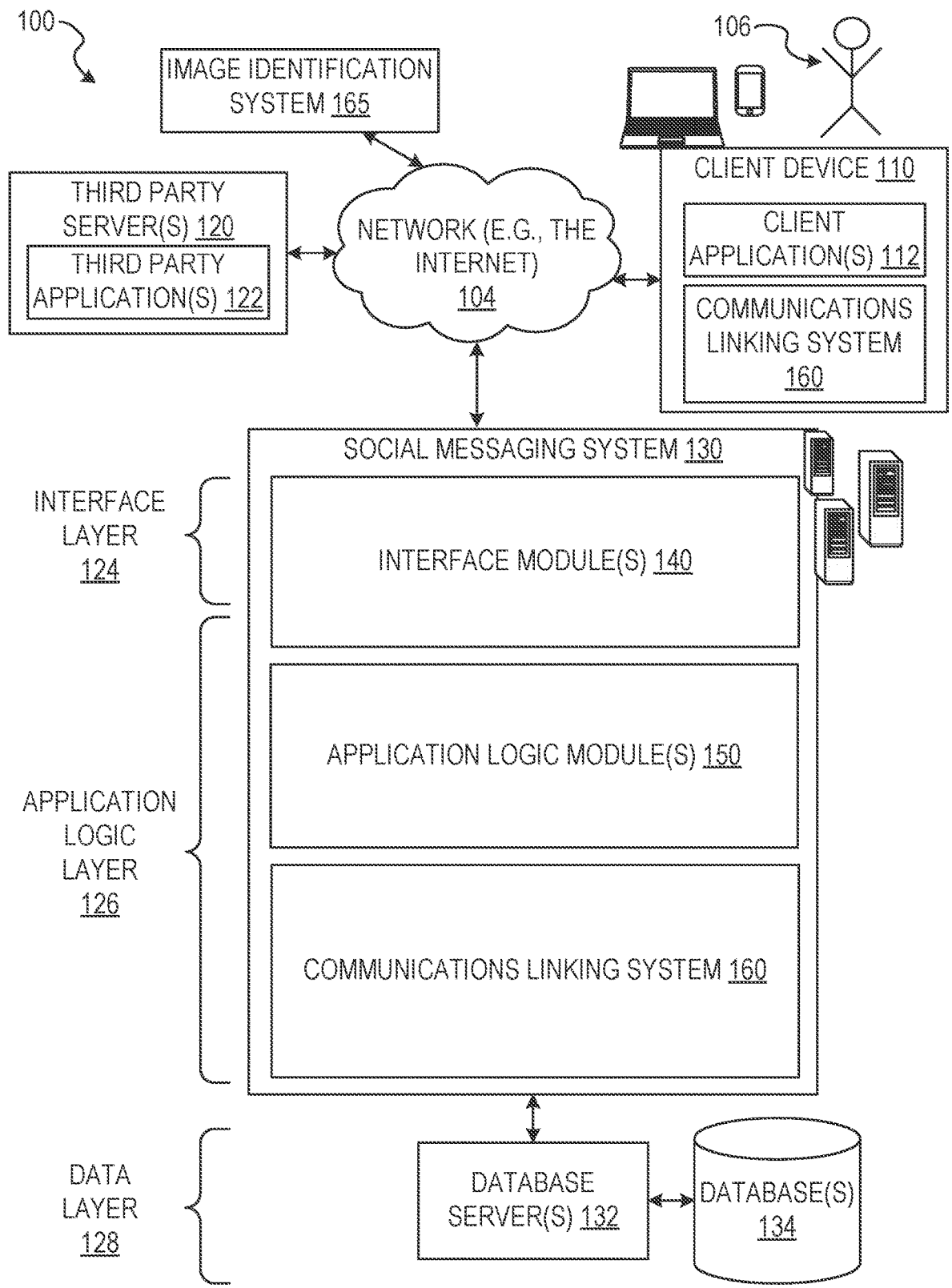
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In one embodiment, an application operating on a device includes images captured or received by the device. The application presents some of the images to a user of the device. The application then links one or more of the images with a network location, such as a website address. The network location may be a source for an image or an address of a network resource, a website, which relates to the image. For example, if the image is a screen shot of a portion of an article published on the website, the application links the image to the website's address. If the image is a picture of the front page of a local newspaper, the application links the image to a web version of the article or the newspaper's website. In order to identify the network location, the application can send the image to an image identification system which returns the network location. The application may also identify search terms and image attributes of the image to identify the network location without use of the image identification system. Where the application fails to identify the network location or receive the network location from an external service, the application can present an error message to a user, either asking for an appropriate link or providing a choice of links to use. The application also enables the user to modify the image by writing, drawing, or otherwise editing the image without leaving the application. The image can be annotated before or after the image has been linked to the network location.

Some embodiments of the present disclosure relate to devices and instructions by one or more processors of a device to link images contained within messages in a communication system to network locations. In some embodiments, the communication system may be an ephemeral message system designed to limit recipient access to some or all messages communicated using the system. For example, some ephemeral message systems may be configured to automatically delete a message with a picture after the picture has been displayed on a screen for a certain amount of time. An ephemeral message including a video may include a trigger to automatically delete the video after it has been viewed a set number of times or within a set time after the first viewing. Some ephemeral message systems may be configured to automatically delete a chat message when a user navigates away from a user interface element presenting the chat message. Other embodiments can limit access to messages in other ways, or may use different combinations of limitations.

In various embodiments, image linking within a communication system involves presenting images at a client device within a graphical user interface. In some instances, an image is displayed as a selectable user interface element such that the image may be selected for linking with a network location for an associated network resource. Once selected, the image may be analyzed by the communication system or an external image identification system to identify search terms and image attributes. The search terms and image attributes may be used alone or in combination as input for one or more search queries to identify the network location for a network resource, such as a source for the image.

Image linking may also involve annotation of the images. The communication system may present one or more annotation tools or user interface elements through which a user manipulates image data representing the image. In some embodiments, when the user annotates an image, the actual image data is manipulated. In other embodiments, the user, annotating the image, is presented with an image layer generated for the purpose of annotation without modification of the underlying image data.

Once the image has been linked to the network location, the image may be transmitted using the communication system. In some example embodiments, a recipient of the linked image may select the image to cause presentation of information from the associated network resource. Selection of the linked image may cause presentation of the network resource information within the application on the device. In some instances, selection of the linked image causes the device to open a second application, different from the first application presenting the linked image. Selection of the linked image may cause the client device on which the first application is operating to cease or pause operation of the first application and initialize or open the second application. For example, selection of the linked image may cause a messaging application to cease and cause the device to open an internet browser, automatically navigating the internet browser to the network location. In some instances, the client device may identify that the network location is associated with a proprietary application currently installed on the client device, such as a company specific application, a restaurant review application, a map application, or other proprietary application. Instead of opening the network location in the internet browser, the application causes the client device to open the proprietary application and directs the proprietary application to present appropriate information associated with the network location.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as using a client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions (e.g., processor executable instructions) and the corresponding hardware (e.g., memory and processor) for executing the instructions, forming a hardware-implemented module or engine and acting, at the time of the execution of instructions, as a special purpose machine configured to carry out a particular set of functions. To avoid obscuring the inventive subject matter, various functional modules and engines that are not germane to conveying an understanding of the inventive subject matter have been omitted from FIG. 1. Of course, additional functional modules and engines may be used with a social messaging system 130, such as that illustrated in FIG. 1, to facilitate additional functionality that is not specifically described herein. Furthermore, the various functional modules and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface modules (e.g., a web server) 140, which receives requests from various client-computing devices and servers, such as client devices 110 executing client application(s) 112, and third party servers 120 executing third party application(s) 122. In response to received requests, the interface module 140 communicates appropriate responses to requesting devices via a network 104. For example, the interface modules 140 can receive requests such as Hypertext Transfer Protocol (HTTP) requests, or other web-based, application programming interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of a communications linking system 160 such that modules of the communications linking system 160 configure the client device 110 to perform a specific set of functions with respect to operations of the communications linking system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 automatically detect images, network resource locations for the detected images, and link the network resource locations to the detected image for inclusion in a message transmitted to other client devices by executing functionality of the communications linking system 160.

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with the application logic modules 150. The social messaging application provides a messaging mechanism for users 106 of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

As illustrated in FIG. 1, the social messaging system 130 may include at least a portion of the communications linking system 160 capable of automatically detecting an image, detecting a network resource location for the image, and linking the network resource location to the detected image for inclusion in a message transmitted to another client device. Similarly, the client device 110 includes a portion of the communications linking system 160, as described above. In other examples, client device 110 may include the entirety of the communications linking system 160. In instances where the client device 110 includes a portion of (or all of) the communication linking system 160, the client device 110 can work alone or in cooperation with the social messaging system 130 and an image identification system 165 to provide the functionality of the communications linking system 160 described herein. Although shown as a stand-alone system, it will be understood that, in some example embodiments, the image identification system 165 is a part of the social messaging system 130.

In some embodiments, the social messaging system 130 may be an ephemeral message system that enables ephemeral communications where content (e.g. video clips or images) is deleted following a deletion trigger event such as a viewing time or viewing completion. In such embodiments, a device uses the various modules described herein within the context of any of generating, sending, receiving, or displaying aspects of an ephemeral message. For example, a device may track a consumption indicator or a touchscreen interaction during viewing of an ephemeral message, and may implement any tracking, command, or interface method described herein both as part of generation of content for an ephemeral message or as part of a user 106 viewing an ephemeral message. In some embodiments, while the ephemeral message is deleted after the deletion trigger event, a content icon, indicating the originator of the ephemeral message and representing the ephemeral message prior to consumption, may remain depicted in the graphical user interface. Further, in some embodiments, where the content icon remains after deletion of the ephemeral message, the communications linking system 160 causes a presentation change to the content icon indicating the deletion of the ephemeral message.

Figure 2:
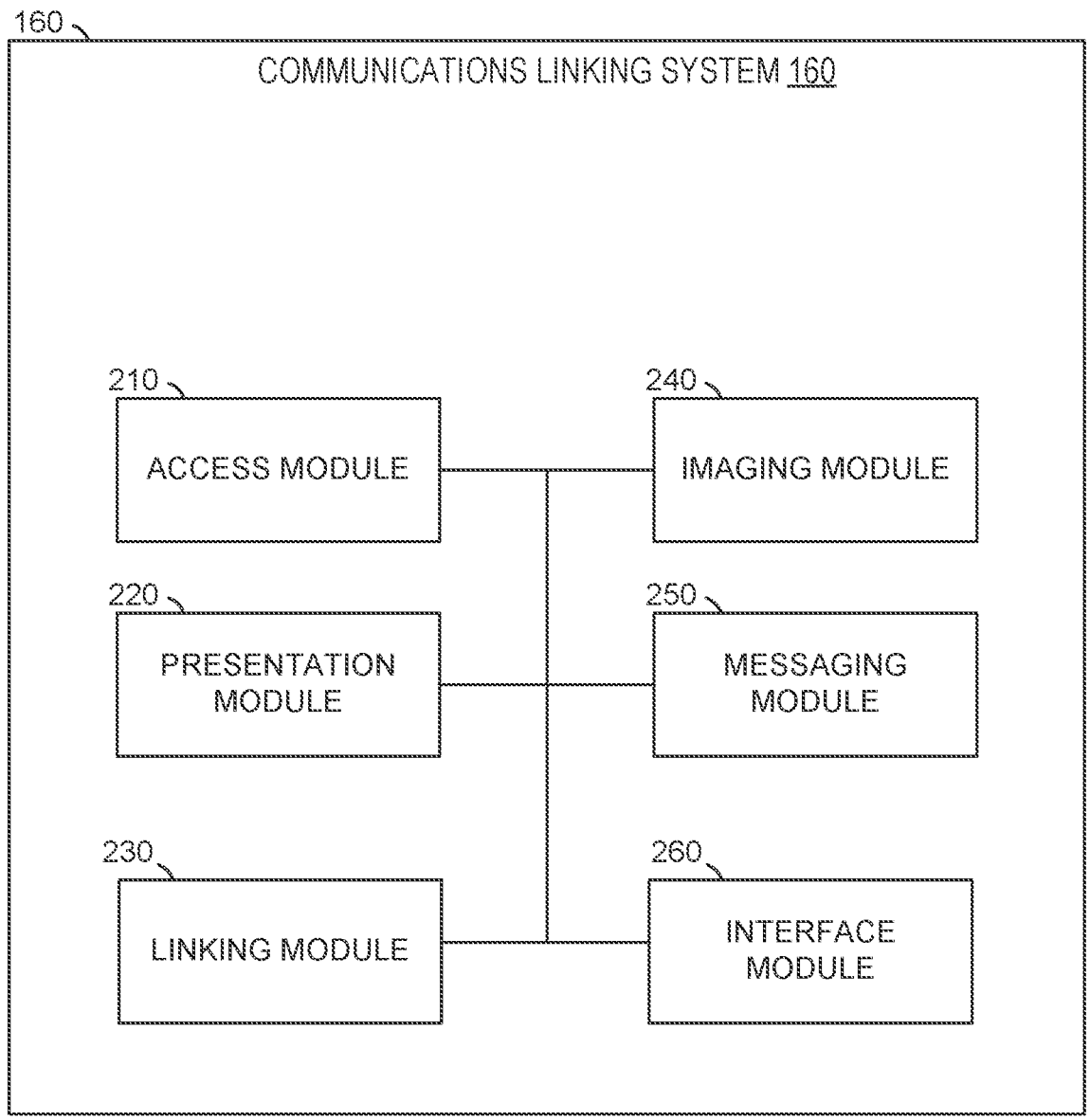
FIG. 2 is a diagram illustrating a communications linking system, according to some example embodiments.

In FIG. 2, in various embodiments, the communications linking system 160 can be implemented as a standalone system or implemented in conjunction with the client device 110, and is not necessarily included in the social messaging system 130. The communications linking system 160 is shown to include an access module 210, a presentation module 220, a linking module 230, an imaging module 240, a messaging module 250, and an interface module 260. All, or some, of the modules 210-260, communicate with each other, for example, via a network coupling, shared memory, and the like. Each module of modules 210-260 can be implemented as a single module, combined into other modules, or further subdivided into multiple modules. Other modules not pertinent to example embodiments can also be included, but are not shown.

The access module 210 accesses an image cache of the client device 110, passing accessed images to the presentation module 220 for presentation on a graphical user interface. In some instances, the access module 210 accesses the image cache stored in integrated non-transitory machine-readable storage media within the client device 110. The access module 210 may cooperate with the messaging module 250 to access an image cache associated with the client device 110 but located remotely therefrom. For example, the access module 210 may access an image cache stored on a network accessible storage media (e.g., a cloud server), a wired storage media (e.g., an external hard drive), and a local area storage (e.g., a wireless storage device connected over an ad hoc network connection).

The presentation module 220 generates a graphical user interface through which the communications linking system 160 presents, organizes, and links images to network locations. In various example embodiments, the presentation module 220 causes presentation of images, message data, network location information, linked images, and failure notifications in the form of user interface elements capable of manipulation in cooperation with one or more of the linking module 230, the imaging module 240, the messaging module 250, and the interface module 260.

The linking module 230 receives a network location for a network resource associated with an image presented by the presentation module 220. The linking module 230 links the network location to the image, based on receiving the network location. In some instances, the linking module 230 performs one or more image recognition functions on the image to identify one or more search terms or one or more image features. The linking module 230 may use the one or more search terms and the one or more image features to identify the network location for the network resource associated with the image, according to some example embodiments.

The imaging module 240 captures images using an imaging device associated or coupled to the client device 110. In some embodiments, the imaging module 240 captures images using one or more functions of the client device 110, such as a screen capture function.

The messaging module 250 provides various communications functionality. For example, the messaging module 250 receives message data from one or more of the social messaging system 130, client devices communicating with the client device 110, and the image identification system 165. The messaging module 250 may cause transmission of message data to a client device of another user via a communications network 104 or to the social messaging system 130. In various embodiments, the messaging module 250 causes transmission of image data or search terms and criteria to the image identification system 165. In some embodiments, the messaging module 250 enables communication between one or more of the access module 210, the presentation module 220, the linking module 230, the imaging module 240, and the interface module 260.

The interface module 260 receives and interprets user input from one or more input devices associated with, coupled to, or integrated within the client device 110. After receiving and interpreting the user input, the interface module 260 passes data representative of the user inputs to one or more modules of the communication linking system 160.

Figure 3:
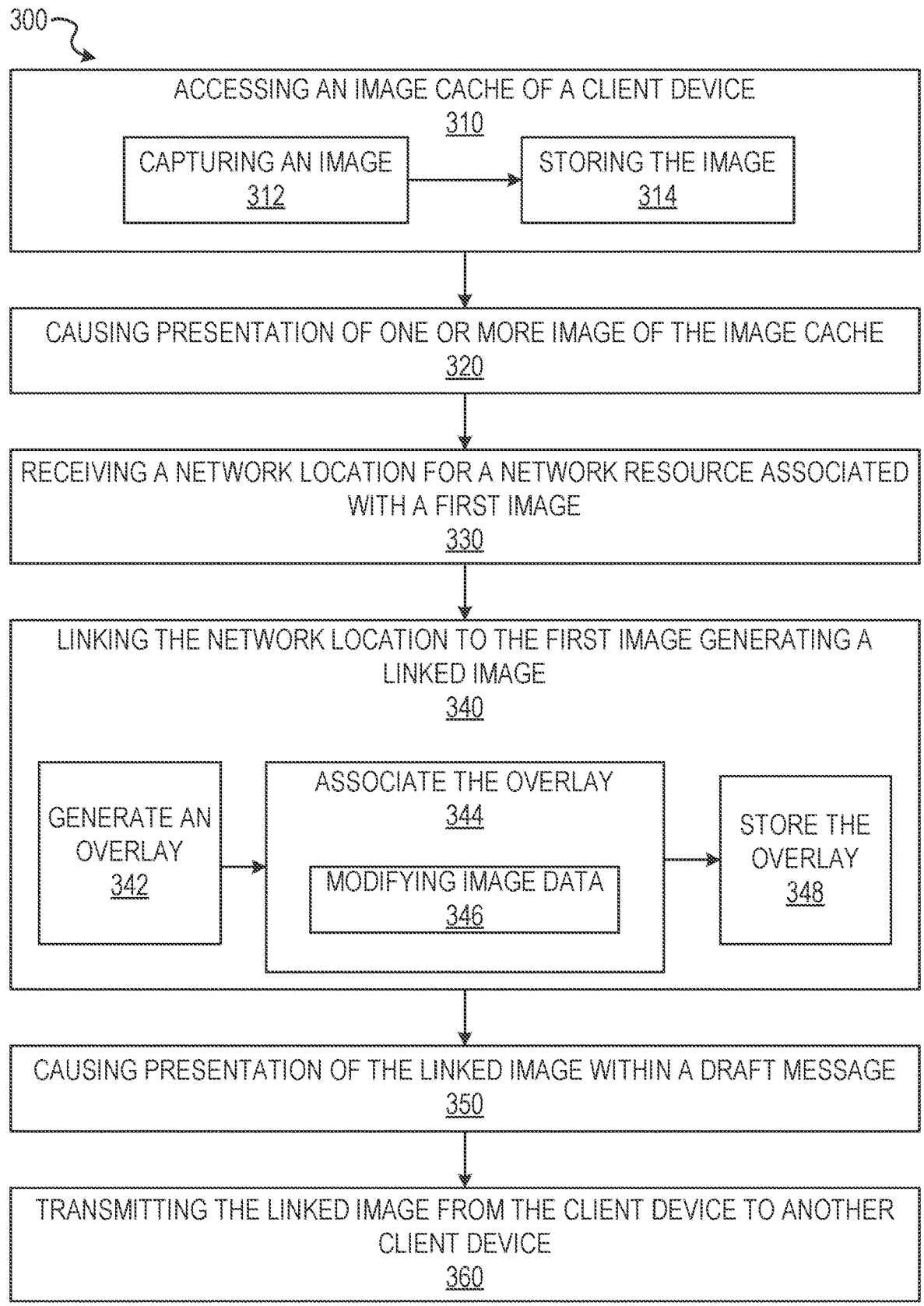
FIG. 3 is a flow diagram illustrating an example method for automatically detecting and linking a network resource location to a portion of message content within a graphical user interface, according to some example embodiments.

FIG. 3 depicts a flow diagram illustrating an example method 300 for automatically detecting and linking a network resource location to a portion of message content within a graphical user interface. The operations of method 300 may be performed by components of the communication linking system 160, and are so described below for purposes of illustration.

In operation 310, the access module 210 accesses an image cache of the client device 110. In various example embodiments, the access module 210 accesses the image cache by accessing a set of images previously captured or otherwise loaded into a non-transitory machine-readable storage medium. For example, the access module 210 may access a folder (e.g., a photo library) stored on the non-transitory machine-readable storage medium of the client device 110. In some embodiments, the access module 210 may access the image cache associated with the client device 110 stored on a non-transitory machine-readable storage medium associated with the client device 110 but remote therefrom. For example, the access module 210 may access the image cache on a networked storage medium, such as a networked storage device (e.g., a cloud database or server machine containing image data associated with the client device 110).

Figure 4:
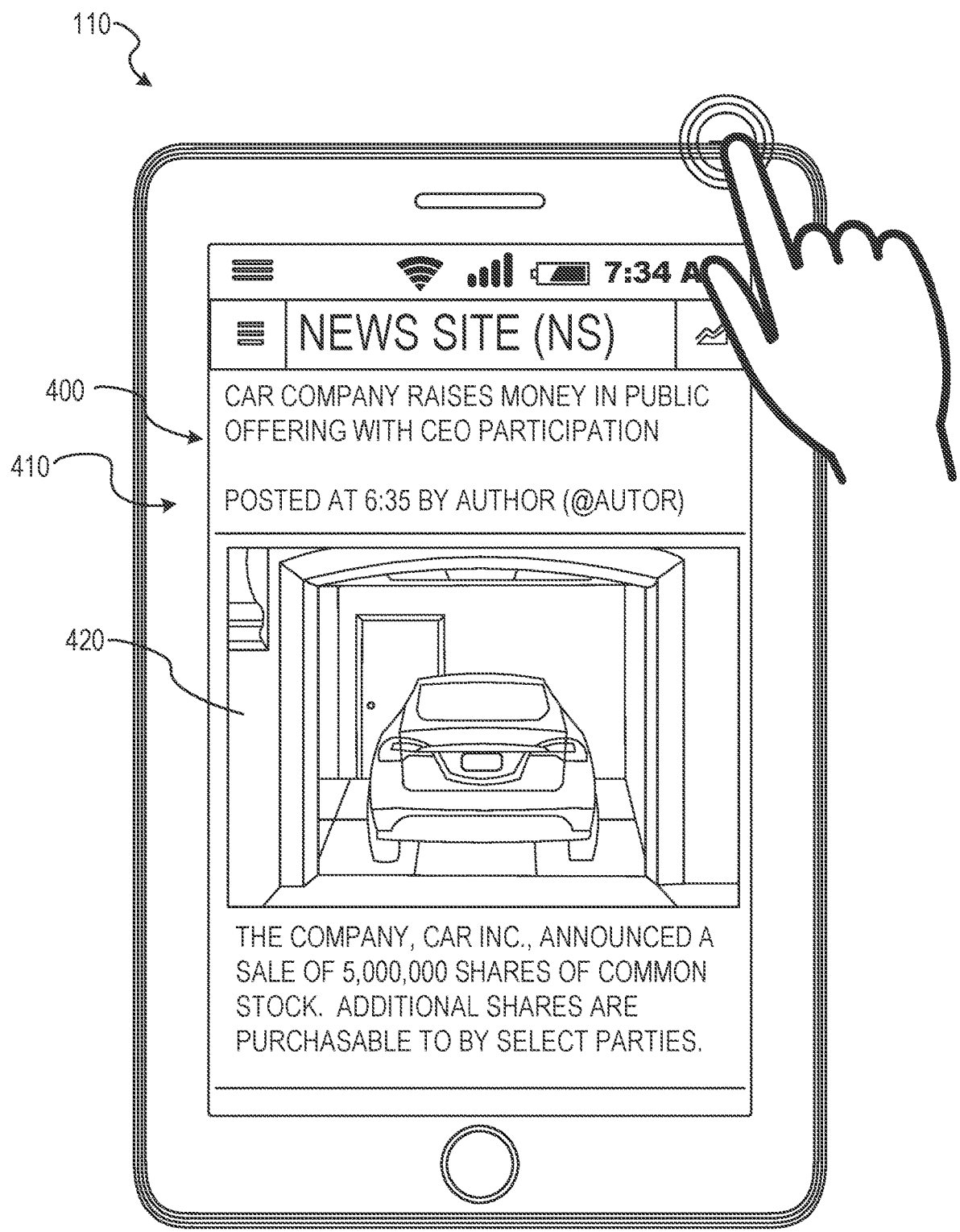
FIG. 4 illustrates an example image capture within a graphical user interface, according to some example embodiments.

In various embodiments, the operation 310 may include one or more sub-operations. For example, in some embodiments, in operation 312 the imaging module 240 captures an image, via an imaging device coupled to the client device 110. The imaging device captures an image having visual content which is associated with a network resource identified by a network location. For example, the imaging device may capture visual content comprising all or a portion of a print article, story, a book (e.g., one or more pages or a cover of the book), or other written or illustrated published material; a screen displaying visual content; a billboard; a physical product with branding; or any other visual content associated with a network resource. In various example embodiments, as shown in FIG. 4, the imaging module 240 captures an image 400 from the graphical user interface 410 where the visual content 420 is displayed at the client device 110. For example, the imaging module 240 may capture an image or set of user interface elements, such as an article from a news site, displayed on the screen of the client device 110 using a screen capture operation or set of operations. As described above, the visual content 420 captured using a screen capture operation may include published material, a representation of a physical product with branding, or any other suitable visual content 420 associated with a network resource.

In operation 314, the imaging module 240 stores the image within the image cache. The imaging module 240 may store the image prior to the messaging application being initiated and based upon the imaging module 240 capturing the image. The image may be stored within the non-transitory machine-readable storage medium. For example, the imaging module 240 may store the image within a photo album, or other folder, representing or otherwise organizing image data within the non-transitory machine-readable storage medium of the client device 110.

Figure 5:
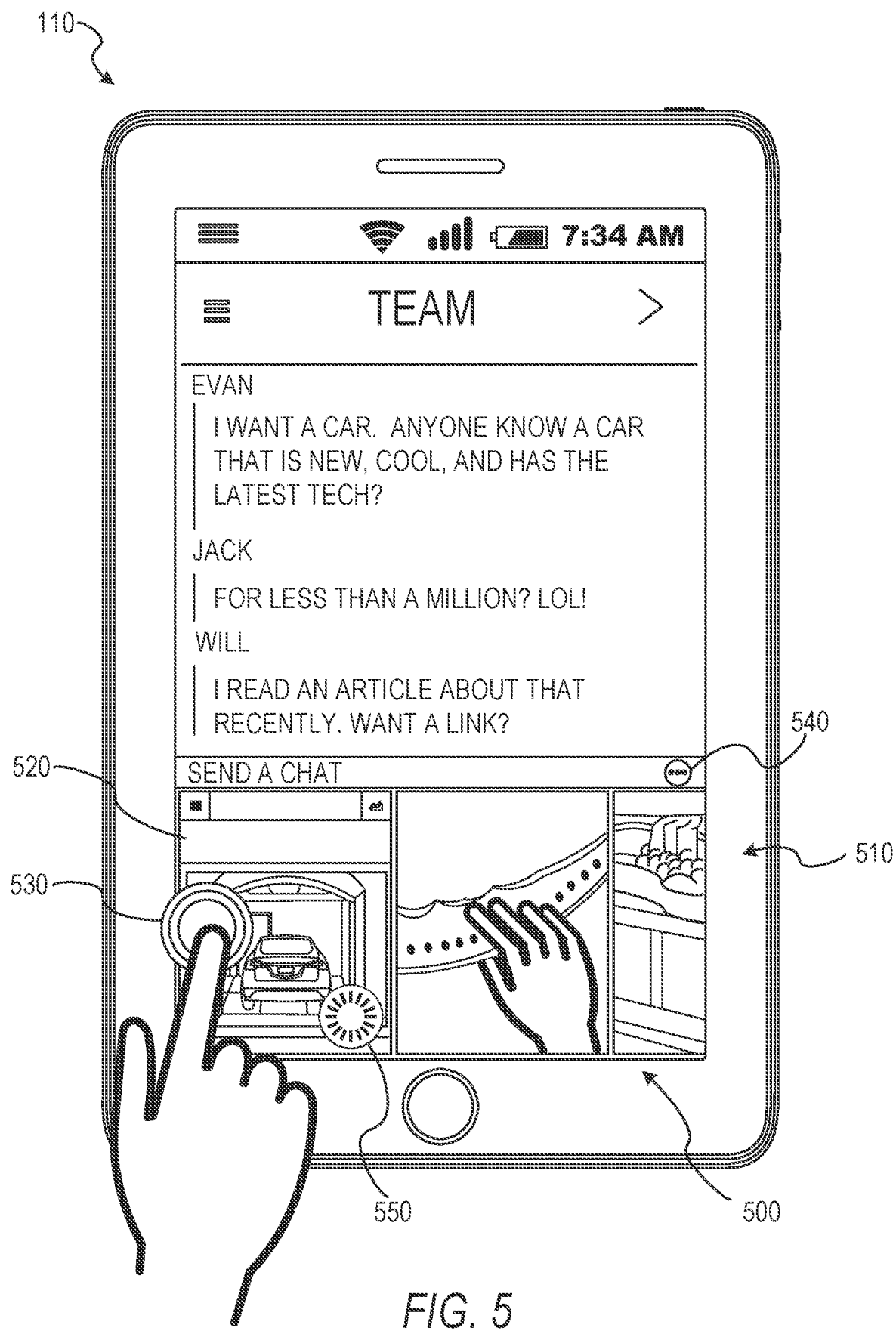
FIG. 5 illustrates an example user interaction to cause linking of a selected image with a network location, according to some example embodiments.

In operation 320, the presentation module 220 causes presentation of one or more images of the image cache within a graphical user interface 410 on the client device 110, as shown in FIG. 5. In various example embodiments, the presentation module 220 presents the one or more images 500 as a set of selectable user interface elements 510. Selecting an image 520 is performed by a user input 530 interacting with a user interface element representing a particular image 520. In addition to the one or more images 500, the presentation module 220 may present an image cache element 540 as a selectable user interface element that, when selected, causes the presentation module 220 to present additional images from the image cache.

In various embodiments, operation 320 comprises one or more sub-operations. For example, in some embodiments, when the presentation module 220 causes presentation of the one or more images 500 via the graphical user interface 410 on the client device 110, the messaging module 250 transmits a first image to the image identification system 165 via a communication network 104. In some instances, the messaging module 250 transmits a single image (e.g., the first image) to the image identification system 165. In various embodiments, the messaging module 250 transmits the first image to the linking module 230. One or more of the image identification system 165 and the linking module 230 identifies a network location associated with the first image.

In various embodiments, the image identification system 165 identifies search terms by performing one or more operations on the first image. The one or more operations comprise optical character recognition (OCR) operations to identify text within the first image, object recognition operations, object identification operations, condition detection operations, content-based image retrieval, pose estimation operations (e.g., estimating a position or orientation of an object within the first image), facial recognition operations, and shape recognition operations. The image identification system 165 may identify one or more search terms from text, objects, persons, logos, textures, or any other aspects or features within the first image.

Once the search terms have been identified, the image identification system 165 may transmit the search terms to the linking module 230 or may perform a search. In embodiments, where the image identification system 165 passes the search terms to the linking module 230, the linking module 230 performs a search to determine the network location for the first image. Where the image identification system 165 performs the search, using the identified search terms, the image identification system 165 generates a set of results, with each result identifying a network location which may be associated with the first image. The image identification system 165 determines a match of one result from the set of results and transmits the result to the linking module 230, such that the linking module 230 receives the network location, as described below with respect to the operation 330. The image identification system 165 determines the match using one or more comparison operations or algorithms. In some embodiments, the image identification system 165 identifies a match based on the number of identified search terms contained within the set of results, where the matching network location contains the greatest number of identified search terms. In some instances, the search terms are also matched based on an order identified for the identified search terms.

In various embodiments, the match is identified based on an image comparison between the first image and the set of results. In these embodiments, the image identification system 165 identifies one or more source images for each network location of the set of results. The one or more source images may represent differing page views, user interface elements, text, or other content which is presented when a browser or other application accesses the network location. The image identification system 165 may capture or otherwise cache the one or more source images and compare the one or more source images to the first image. A match between a source image and the first image may occur where a percentage of features of the first image and the source image are identical or within a predetermined margin of error.

In some instances, the image identification system 165 performs a first search for network locations using the identified search terms, as described above. After generating a first set of results, the image identification system 165 performs a second search on the first set of results. The second search is an image search, such as a reverse image search, using the first set of results as the pool of possible network locations being searched. In some instances, the image identification system 165 may generate images for portions of each of the network locations identified in the first set of search results and compare the generated images to the first image. The image identification system 165 generates a second set of results based on the second search. In some instances, the second set of results is a single network location. Where the second set of results includes a plurality of network locations, the image identification system 165 may perform one or more additional searches, using variations of search terms and image comparison to identify a single network location. In some instances, the image identification system 165 transmits the second set of results to the messaging module 250 to be presented by the presentation module 220, as will be described in more detail below.

Although described with respect to the image identification system 165 it will be understood that, in various example embodiments, the linking module 230 performs a portion or all of the operations of the image identification system 165 in identifying search terms from the first image. After identifying the search terms, the linking module 230 identifies a set of results based on the search terms. The set of results comprise a set of network locations which may be associated with the first image. The linking module 230 determines the network location with content which matches the first image, and selects that network location as the network location to be linked to the first image.

In either embodiment, the messaging module 250 may transmit a plurality of images to the image identification system 165 or the linking module 230 including the first image. The messaging module 250 automatically transmits the first image to the image identification system 165 or the linking module 230, without user input, based on presentation of the one or more images 500.

The messaging module 250 may also transmit the first image to the image identification system 165 or the linking module 230 based on a user input received by the interface module 260, as will be described in more detail with respect to FIG. 4. In various embodiments, the messaging module 250 selects between automatic transmission of the first image and user input based transmission of the first image. The messaging module 250 may identify a user preference to determine whether to automatically transmit the first image or wait until the interface module 260 receives user input selecting the first image. The user preference may be a selectable preference setting within a settings menu of the messaging application. In these embodiments, where the user 106 has selected automatic transmission, the messaging module 250 automatically transmits the first image based on presentation of the one or more images 500 on the graphical user interface 410. Where the user 106 has selected a preference for user input prompted transmission, the messaging module 250 transmits the first image after receiving the indication of selection from the interface module 260.

The messaging module 250 may select between automatic transmission and user input prompted transmission based on one or more settings, preferences, or data transmission characteristics outside of the messaging application. Settings, preferences, and data transmission characteristics may comprise permission settings of an operating system, data transmission and background operation preferences, a data rate (e.g., upload/download speed) of a communication network 104 accessed by the client device 110, a data plan associated with the client device 110, or any other suitable setting, preference, or data transmission characteristic. For example, operating system permissions and data transmission and background operation preferences may include one or more settings of the client device 110 preventing applications from automatically contacting outside resources without user interaction. In some instances, prior to automatically transmitting the first image, the messaging module 250 determines an upload speed and a download speed of the communication network 104. Where one or more of the upload speed and the download speed fall below a predetermined threshold (e.g., a network connection below fifty megabits per second upload and one-hundred megabits per second download). In some embodiments, the messaging module 250 determines a data usage cap associated with the client device 110 and automatically transmits the first image if a current data usage is below a predetermined threshold (e.g., twenty-five percent of the data usage cap, below one gigabyte of data transmitted, or any other suitable threshold).

Figure 6:
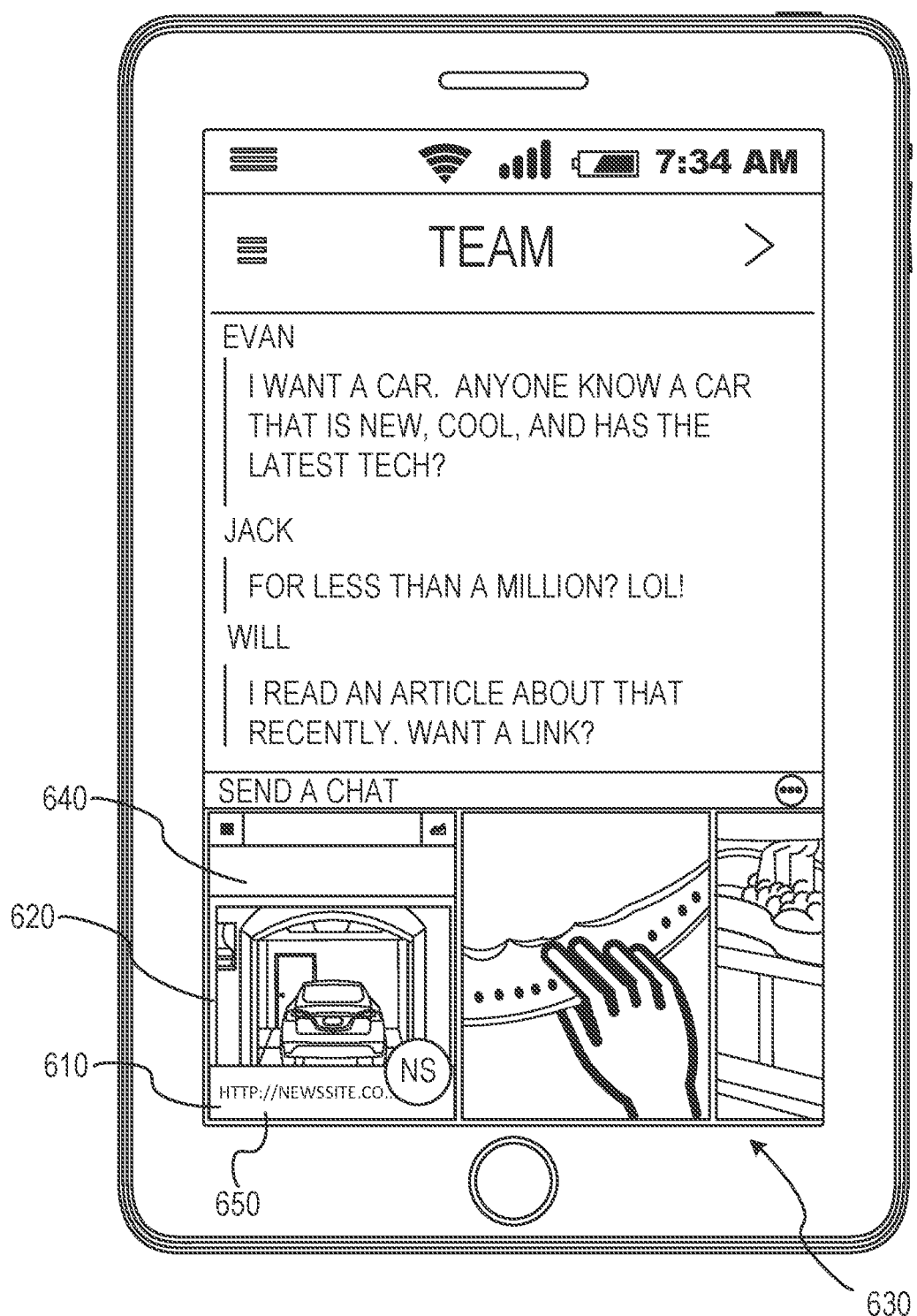
FIG. 6 illustrates an example presentation of a linked image, according to some example embodiments.

In operation 330, as shown in FIG. 6, the linking module 230 receives a network location 610 for the network resource associated with a first image 620 of the one or more images 630. In various embodiments, as described with respect to the operation 320, the first image 620 is a screen capture of one or more images 630 presented within the graphical user interface 410 of the client device 110. In some instances, the network location 610 is a network address for the network resource. For example, the network location 610 may be an internet protocol (IP) address, a local area network address (e.g., an internetwork packet exchange (IPX) address), a circuit-switched data network address (e.g., an X25 or X21 address), a media access control (MAC) address, or any other suitable identifier for a network location 610 of a network resource.

In some embodiments, the network location 610 may be selected from a set of network locations. In these instances, one or more of the linking module 230 and the image identification system 165 selects the network location 610 from the set of network locations. The image identification system 165 receives the first image 620, as described in some embodiments of the operation 320, the image identification system 165 may identify the set of network locations and select the network location 610 having a closest match to the first image 620.

Referring again to FIG. 3, in operation 340, the linking module 230 links the network location 610 to the first image 620 to generate a linked image 640, as shown in FIG. 6. The linking module 230 links the network location 610 to the first image 620 based on receiving the network location 610. The linking module 230 links the network location 610 selected or received in the operation 330 to the first image 620 by storing the network location 610 within metadata associated with the first image 620. In some embodiments, the linking module 230 modifies one or more portions of the image to include the network location 610, which may be presented with the first image 620 or stored in the image data comprising the first image 620 but not visually presented within the graphical user interface 410.

In various embodiments, the operation 340 comprises one or more sub-operations. For example, in some embodiments, the operation 340 includes the operation 342. In operation 342, the linking module 230 generates an overlay element 650 representing the network location 610. The overlay element 650 comprises a selectable user interface element 510 and an indication of the network location 610. In some embodiments, the overlay element 650 is presented together with the first image 620 such that a portion of the first image 620 is at least partially obscured by the overlay element 650. In some embodiments, the indication of the network location 610 is presented as at least a portion of a network address such as a portion of a web address, a portion of an IP address, or any other suitable address identifying the network location 610. In some embodiments, the network location 610 is presented as a string of text, such as a title of an article, book, network resource, or other published material associated with the first image 620.

Referring back to FIG. 3, in operation 344, the linking module 230 associates the overlay element 650 with the first image 620, as shown in FIG. 6. The overlay element 650 may be associated with the first image 620 by modifying a portion of the image data comprising the first image 620 or data relating to the first image 620. In various embodiments, the operation 344 includes an operation 346, associating the overlay element 650 with the first image 620 by modifying the image data comprising the first image 620. In these embodiments, the linking module 230 modifies the image data to include the overlay element 650 or a reference to the overlay element 650. In some embodiments, associating the overlay element 650 with the first image 620 comprises adding the overlay as a layer to the first image 620.

In various embodiments, the operation 344 includes an operation 348, in which the linking module 230 stores one or more of the overlay element 650 and the network location 610 in metadata associated with the first image 620. In these instances, the overlay element 650 is associated with the first image 620 by modifying metadata for the first image 620 to include a link, reference, or other representation of the network location 610 or the overlay element 650. In some instances, the metadata may reflect a storage location for data representing the overlay element 650, such that when the first image 620 is accessed, the overlay element 650 is also accessed by the client device 110.

In some embodiments, the presentation module 220 causes presentation of a linking indicator 550 during pendency of the operations 320, 330, and 340, as shown in FIG. 5. The presentation of the one or more images 500 of the image cache may trigger the presentation module 220 to cause presentation of the linking indicator 550. In some instances, the linking indicator 550 is an animated image. The linking indicator 550 may be a series of lines displayed radially around a center point sequentially changing color, shade, size, orientation, or other aspect to indicate a period of operation or waiting for the user 106. Although described as an animated image, the linking indicator 550 may be any suitable static or animated image. For example, the linking indicator 550 may be presented in the form of an hourglass, a pinwheel, a clock face, or any other suitable icon (e.g., animated image or static image).

The linking indicator 550, in these embodiments, provides a notification that the messaging application is performing one or more functions with respect to the one or more images 500 of the image cache. For example, where the linking module 230 is waiting to receive or attempting to identify the network location 610 for the first image 520, the presentation module 220 presents the linking indicator 550 in a position proximate to or covering at least a portion of the first image 520. Once the linking module 230 receives the network location 610 and links the network location 610 with the first image 520, the linking module 230 may pass a link notification to the presentation module 220. The link notification indicates that the network location 610 has been successfully linked to the first image 520 or that the link has failed.

Where a plurality of images of the image cache are to be linked to one or more network locations 610, the presentation module 220 presents one or more linking indicators 550 reflecting the linking process with respect to one or more of the images. For example, the presentation module 220 may present a single linking indicator 550 which is repositioned from the first image 520 to a second image when the first image 520 has been linked with the network location 610. In some instances, the presentation module 220 causes presentation of a linking indicator 550 for each image of the plurality of images. Once an image has been linked to a network location 610, the presentation module 220 ceases presentation of the linking indicator 550 for the linked image 640.

Figure 7:
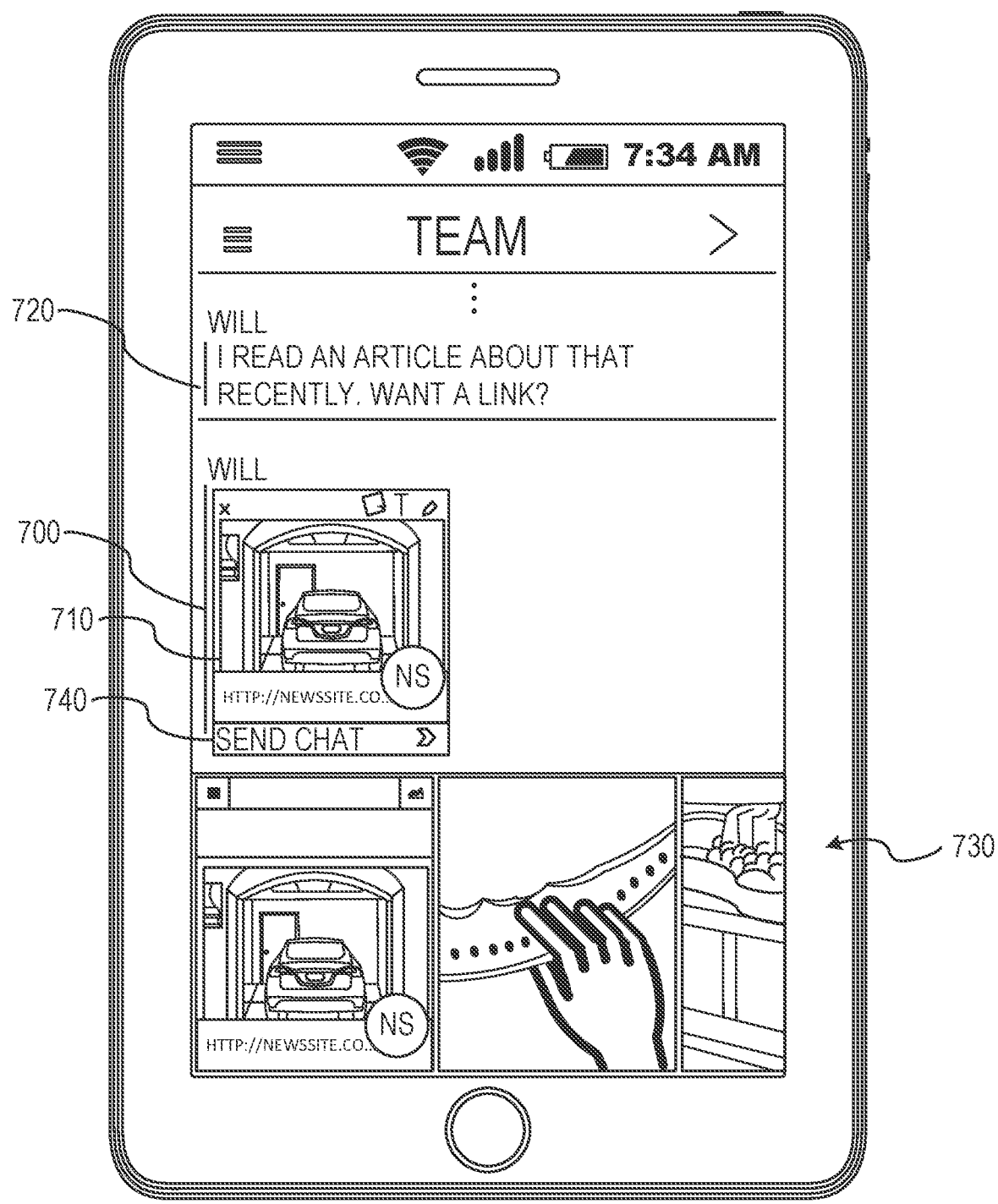
FIG. 7 illustrates an example presentation of a selected linked image in a draft message, according to some example embodiments.

In operation 350, the presentation module 220 causes presentation of the linked image 640 within a draft message 700 in the graphical user interface 410 presented on the client device 110, as shown in FIG. 7. The presentation module 220 may present the linked image 710 within a graphical user interface 410 displaying the messaging application. In various embodiments, the presentation module 220 presents the linked image 710 within the draft message 700 as separate from the presentation of a message thread 720 in which the draft message 700 will be included. Further, the presentation module 220 presents the linked image 710 within the draft message 700 separate from the presentation of the one or more images 730 of the image cache. In addition to the linked image 710, the draft message 700 may include a data entry field 740 configured to receive user input in the form of alphanumeric characters (e.g., text) for inclusion along with the linked image 710.

In various embodiments, the presentation of the linked image 710 within the draft message 700 is triggered by a user input. For example, in some embodiments, the operation 340 linking the network location 610 to the first image 620, triggers the interface module 260 to enable selection of the linked image 710. The interface module 260 receives a selection of the linked image 710 by tapping a touchscreen or cursor selection (e.g., clicking or double clicking with a mouse). The interface module 260 passes an indication of the selection to the presentation module 220, and the presentation module 220 causes presentation of the linked image 710 within a draft message 700.

In at least some instances, generating the linked image 710 (e.g., the linking module 230 linking the network location 610 to the first image 620) triggers the presentation module 220 to cause presentation of the linked image 710 within the draft message 700. In some embodiments, the automatic inclusion of the linked image 710 in the draft message 700 is initiated by the capture method for the first image 620. For example, in some instances, the client device 110 captures the first image 620 as a result of a screen capture operation in conjunction with a selection for the messaging application. The selection of the messaging application during the screen capture operation automatically triggers initialization of the messaging application. The initialization of the messaging application, in turn, triggers the access and presentation of the one or more images 730 of the image cache and the generation of the linked image 710, once the network location 610 has been received. The generation of the linked image 710 automatically triggers the presentation of the linked image 710 within the draft message 700.

In operation 360, the messaging module 250 transmits the linked image 710 from the client device 110 to another device via a communication network 104. In various example embodiments, the messaging module 250 transmits the linked image 710 in response to user input within the graphical user interface 410. The messaging module 250 may receive indication of a selection of a message icon (e.g., a send or post user interface element) from the interface module 260. The messaging module 250, receiving indication of the user input, transmits the draft message 700 to a recipient identified within the messaging application to a network location 610 or device associated with the recipient via the communication network 104 (e.g., the Internet).

Figure 8:
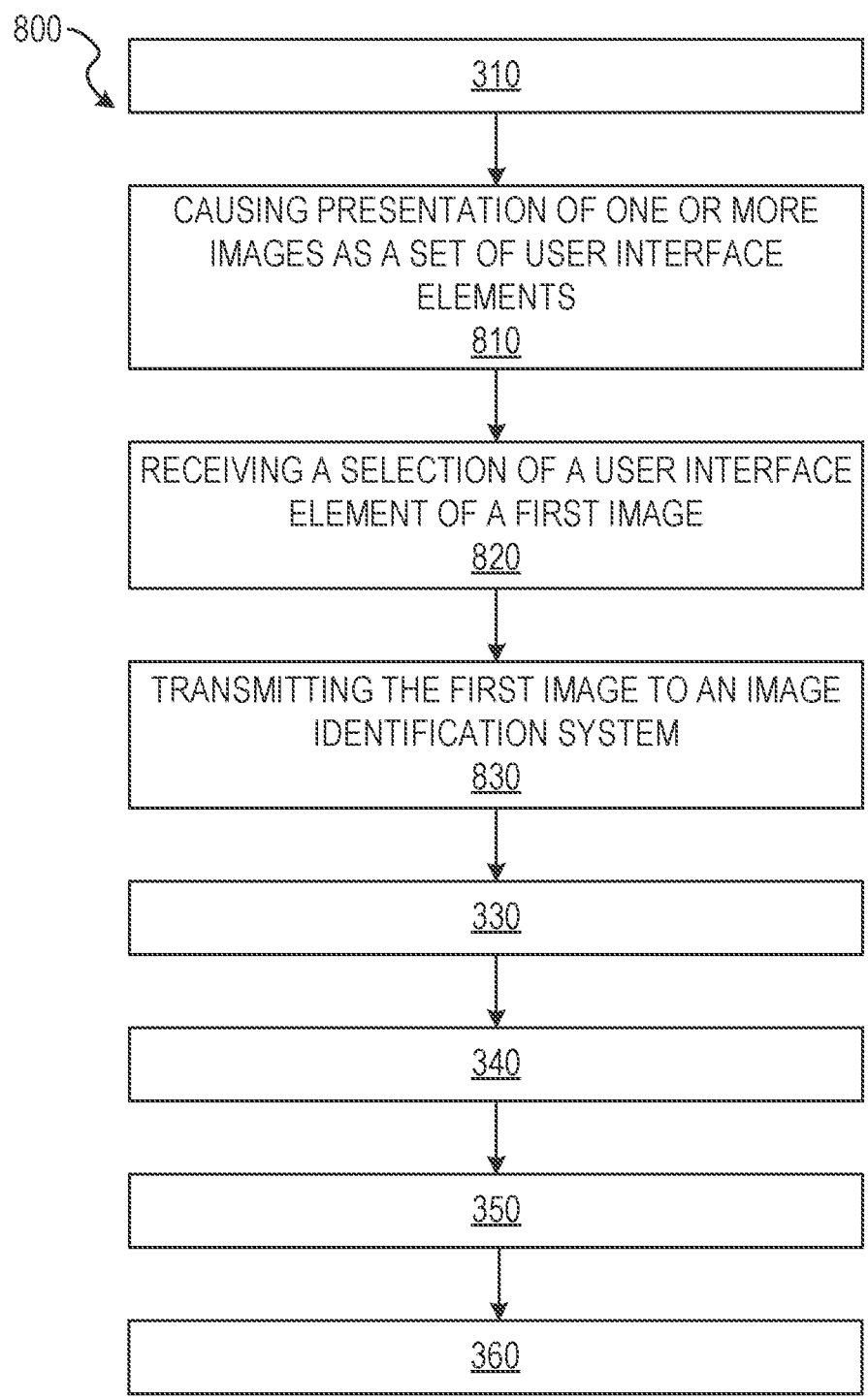
FIG. 8 is a flow diagram illustrating an example method for automatically detecting and linking a network resource location to a portion of message content within a graphical user interface, according to some example embodiments.

FIG. 8 shows a flow diagram illustrating an example method 800 for automatically detecting and linking a network resource location to a portion of message content within a graphical user interface 410. The operations of method 800 may be performed by components of the communication linking system 160. In some instances, certain operations of the method 800 may be performed using one or more operations of the method 300 or as sub-operations of one or more operations of the method 300, as will be explained in more detail below.

In operation 810, the presentation module 220 causes presentation of the one or more images 730 as a set of user interface elements. The one or more images 730 may be presented by the presentation module 220 as user interface elements the manipulation of which may be interpreted by the interface module 260 to trigger one or more operations within the messaging application. In various embodiments, selection of an image from the one or more images 730 cause the presentation module 220 to present a menu comprising one or more operations which may be performed on an image or with respect to the image. For example, upon selection of the first image 620, the presentation module 220 may cause presentation of a menu including a link element. The link element is a user interface element within the menu the selection of which triggers the linking module 230 and the messaging module 250 to perform one or more operations to identify and link the network location 610 to the first image 620.

In operation 820, based on the presentation of the one or more images 730 of the image cache (e.g., in operations 810 or 320), the interface module 260 receives a selection of a user interface element of the set of user interface elements. The selected user interface element may represent the first image 620 of the one or more images 730, as described with respect to the operation 320. In some instances, the interface module 260 receives a plurality of selections. For example, the interface module 260 may receive a first selection of the first image 620 and a second selection of a menu option (e.g., the link element) indicating an operation to be performed on the first image 620. The interface module 260 receives the selection of the user interface element via a user input device such as a touchscreen, a mouse, a keyboard, or other suitable device capable of receiving user interaction and passing an indication of the user interaction to the interface module 260.

In these embodiments, the presentation module 220 causes presentation of the one or more images 730 as selectable user interface elements 510. The interface module 260 receives a user input selecting the first image 620 from the one or more images 730 of the image cache. The interface module 260 may pass an indication of the selection of the first image 620 to the messaging module 250. Based on receiving the indication of the selection of the first image 620, the messaging module 250 transmits the first image 620 to the image identification system 165 or the linking module 230.

In operation 830, based on the selection of the user interface element, the messaging module 250 transmits the first image 620 to an image identification system 165 via the communication network 104. The interface module 260 passes the indication of the user interaction (e.g., the selection of the user interface element) to the messaging module 250. Passing the selection of the user interface element triggers the messaging module 250 to transmit the first image 620 to the image identification system 165. In various embodiments, transmitting the first image 620 to the image identification system 165 triggers the presentation module 220 to cause presentation of the linking indicator 550, described above with respect to the operation 340.

Based on selection of the user interface element, one or more of the linking module 230 and the messaging module 250 are triggered to transmit the first image 620 to the image identification system 165. The image identification system 165 receives the first image 620 as an input for a search query as a result of operation 830. The image identification system 165 identifies search terms from the image or performs a reverse image search using the first image 620 as input for the image search. Where the image identification system 165 identifies search terms, the search terms may be identified from metadata associated with the first image 620. In some embodiments, search terms are identified from the image data of the first image 620. For example, the image identification system 165 may perform one or more image processing functions on the first image 620, as described above with respect to the operation 320.

In various embodiments, the method 800 may then be completed by performing the operations 330, 340, 350. As described above, in operation 330, the linking module 230 receives a network location 610 for the network resource associated with a first image 620 of the one or more images 730. In operation 340, the linking module 230 links the network location 610 to the first image 620 to generate a linked image 710. In operation 350, the presentation module 220 causes presentation of the linked image 710 within a draft message 700 in the graphical user interface 410 presented on the client device 110. Finally, in operation 360, the messaging module 250 transmits the linked image 710 from the client device 110 to another device via a communication network 104.

Figure 9:
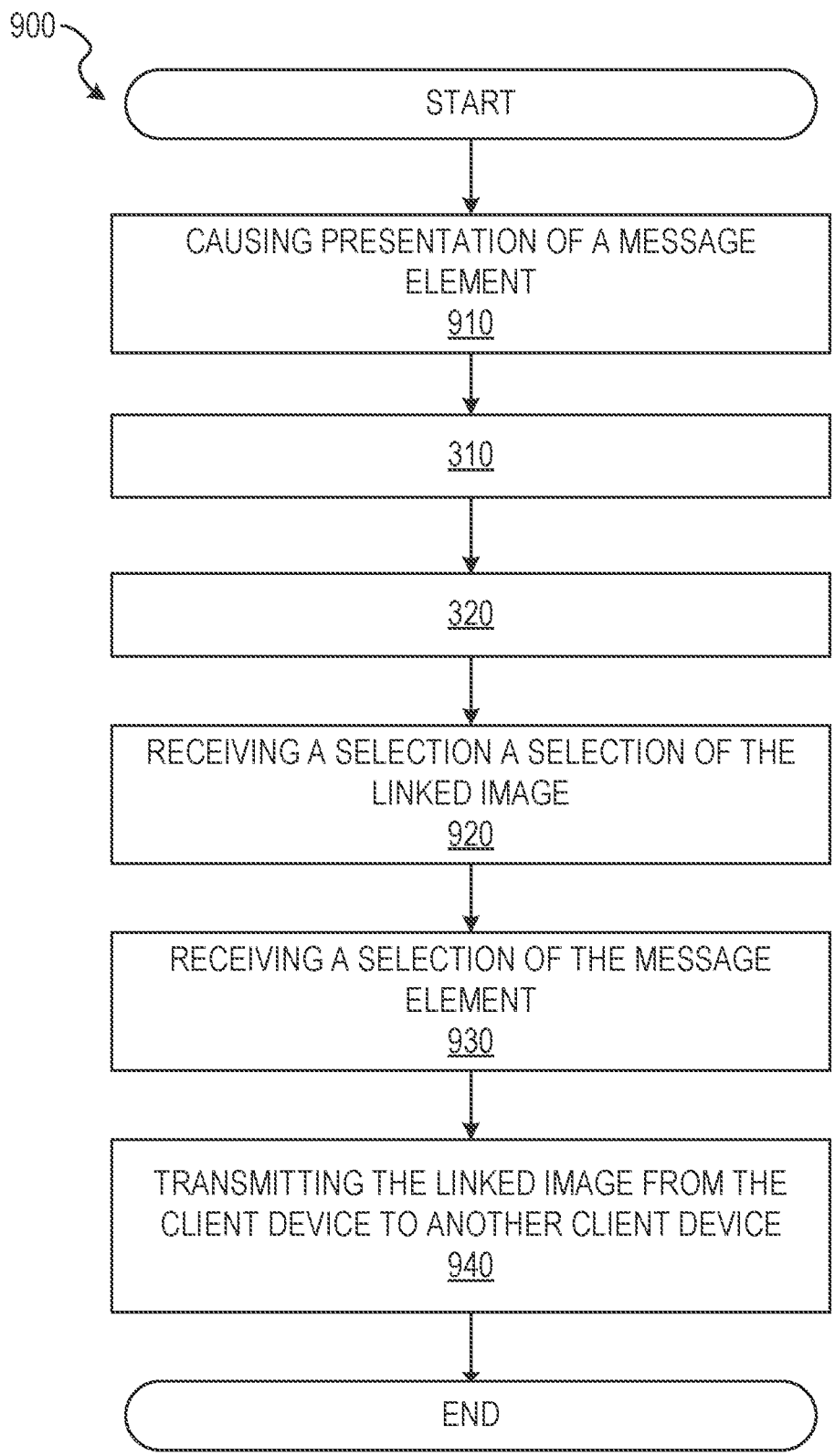
FIG. 9 is a flow diagram illustrating an example method for automatically detecting and linking a network resource location to a portion of message content within a graphical user interface and transmitting the linked resource location within the message content, according to some example embodiments.

FIG. 9 depicts a flow diagram illustrating an example method 900 for automatically detecting and linking a network resource location to a portion of message content within a graphical user interface 410 and transmitting the linked resource location within the message content. The operations of method 900 may be performed by components of the communication linking system 160. In some instances, certain operations of the method 900 may be performed using one or more operations of the methods 300 or 800, in one or more of the described embodiments, or as sub-operations of one or more operations of the methods 300 or 800, as will be explained in more detail below.

In operation 910, the presentation module 220 causes presentation of a message element. In various embodiments, initiation of the messaging application triggers the presentation module 220 to present the message element. The message element comprises a selectable user interface element 510. Selection of the message element triggers the access module 210 to access the image cache, as described in the operation 310, and the presentation module 220 to cause presentation of the one or more images of the image cache within the graphical user interface 410, as described with respect to the operation 320. Presentation of the one or more images 730 may cause the linking module 230 to receive the network location 610 for the network resource associated with the first image 620, as described in operations 330 and 830.

In operation 920, the interface module 260 receives a selection of the linked image 710. After the presentation module 220 causes presentation of the one or more images 730 of the image cache, as described in operation 320, and the linking module 230 links the network location 610 to the first image 620 to create the linked image 710, as described in operation 340, one or more of the presentation module 220 and the interface module 260 enables selection of the linked image 710, which may be the first image 620 included within the one or more images 730 presented by the presentation module 220. Once selection is enabled for the linked image 710, the interface module 260 receives the selection of the linked image 710 by interpreting a user interaction with the linked image 710. For example, the interface module 260 may interpret a touch on a touchscreen of the client device 110, a mouse interaction (e.g., a click), a button press of a physical keyboard associated with the client device 110, or any other suitable user interaction as the selection of the linked image 710. Selection of the linked image 710 causes the interface module 260 to pass the linked image 710, or an indication of the selection, to the messaging module 250.

In various embodiments, when the user 106 is selecting from among the one or more images 730 from the image cache, including the linked image 710, the presentation module 220 removes presentation of the message element. For example, the presentation module 220 may present the one or more images 730 in a portion of the graphical user interface 410 which substantially obscures the messaging element. Once the interface module 260 receives the selection of the linked image 710, the presentation module 220 causes presentation of the message element again. In some embodiments, the message element is presented proximate to the linked image 710.

In operation 930, the messaging module 250 receives a selection of a message element. As referenced above, the messaging module 250 may receive the selection of the linked image 710, or an indication of that selection, from the interface module 260. Selection of the linked image 710 triggers the presentation module 220 to present the linked image 710 within a draft message 700. For example, the draft message 700 may be presented in a portion of the graphical user interface 410 distinct from a message thread 720 (e.g., a series of messages transmitted and received indicating a conversation). As described above, the presentation module 220 may represent the message element, previously obscured by presentation of the one or more images 730 of the image cache, after the linked image 710 is selected. In some embodiments, the message element is presented proximate to the draft message 700. Based on presentation of the linked image 710 within the draft message 700, the messaging module 250 receives selection of the message element via the interface module 260.

In operation 940, the messaging module 250 causes transmission of the linked image 710 from the client device 110 to another client device via the communication network 104. Selection of the message element, while the draft message 700 is presented on the graphical user interface 410, triggers the messaging module 250 to cause transmission of the linked image 710. In various embodiments, the messaging module 250 transmits the linked image 710 via the communication network 104 (e.g., the Internet) from the client device 110 to another client device. In some instances, the linked image 710 is transmitted from the client device 110, through the social messaging system 130, to the other client device.

Figure 10:
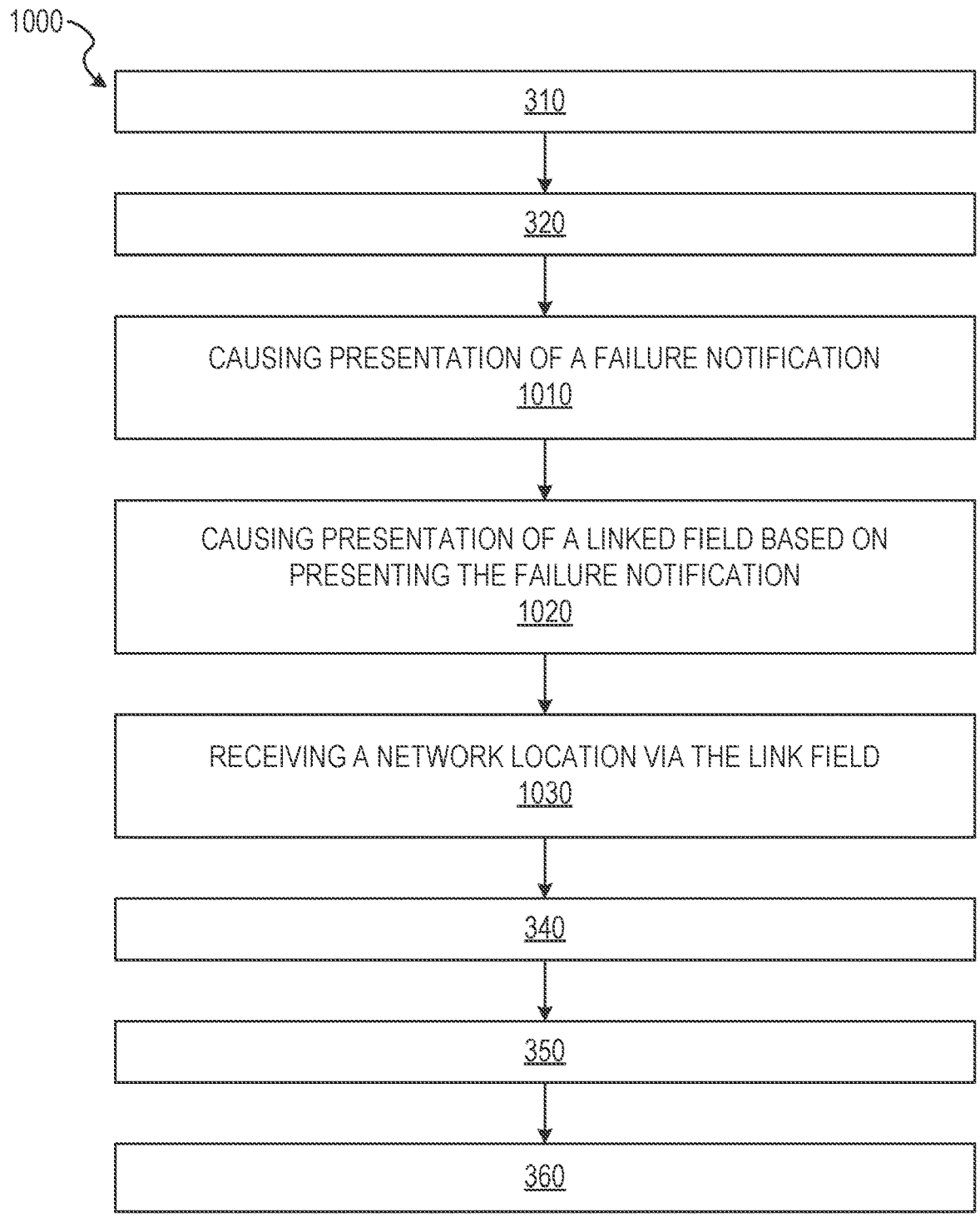
FIG. 10 is a flow diagram illustrating an example method for automatically detecting and responding to a failure to link a network resource location to a portion of message content within a graphical user interface, according to some example embodiments.

FIG. 10 depicts a flow diagram illustrating an example method 1000 for automatically detecting and responding to a failure to link a network resource location to a portion of message content within a graphical user interface 410. The operations of method 1000 may be performed by components of the communication linking system 160. In some instances, certain operations of the method 1000 may be performed using one or more operations of the methods 300, 800, or 900, in one or more of the described embodiments, or as sub-operations of one or more operations of the methods 300, 800, or 900, as will be explained in more detail below.

In various embodiments, the method 1000 may initially include one or more operations of the method 300. In these embodiments, the access module 210 accesses the image cache of the client device 110, as in the operation 310. The presentation module 220 causes presentation of one or more images of the image cache within the graphical user interface 410, as described in the operation 320. However, as discussed below, the linking module 230 fails to receive the network location 610 for the network resource associated with the first image 620 of the one or more images 730.

Figure 11:
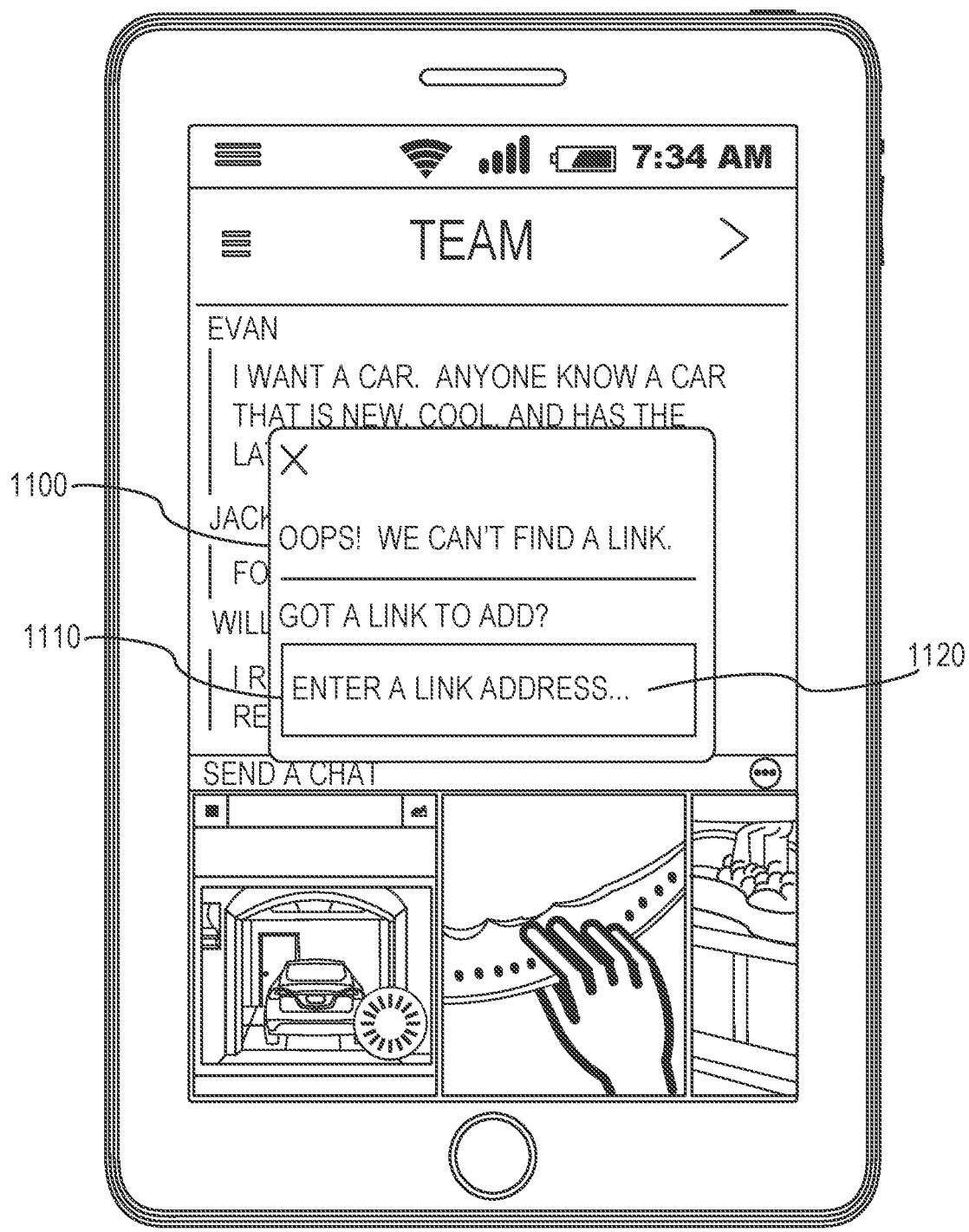
FIG. 11 illustrates an example presentation of a failure notification, according to some example embodiments.

In operation 1010, the presentation module 220 causes presentation of a failure notification 1100, as shown in FIG. 11. The failure notification 1100 indicates failure to link the network location 610 to the first image 620. In various embodiments, the failure notification 1100 is triggered by one or more of the linking module 230 and the messaging module 250. Where the message module 250 fails to transmit the first image 620 to the image identification system 165, the message module 250 generates an indication of a transmission failure. For example, the transmission failure may comprise one or more data packets indicating the transmission failure due to lack of network connection, lack of a response to the transmission of the first image 620, or any other network failure.

In embodiments where the linking module 230 triggers the failure notification 1100, the linking module 230 indicates a transmission failure, where the linking module 230 fails to access one or more network resource, or receive a suitable reply from the network resource, to identify the network location 610 for the first image 620. In some embodiments, the linking module 230 triggers the failure notification 1100 based on a failure to receive the network location 610 for the network resource associated with the first image 620. In these embodiments, the linking module 230 triggers the failure notification 1100 based on a monitored condition. The monitored condition may be a success or failure indication from a network search resource (e.g., the image identification system 165), a predetermined time period, or any other suitable indication of a failure to receive a response to network traffic.

The messaging module 250 or the linking module 230, triggering the failure notification 1100, passes an indication of failure to the presentation module 220. Receiving the indication of failure notification 1100 triggers the presentation module 220 to cause presentation of the failure notification 1100 on the graphical user interface 410.

Referring again to FIG. 10, in operation 1020, the presentation module 220 causes presentation of a link field 1110 based on presenting the failure notification 1100, as shown in FIG. 11. In some embodiments, the link field 1110 may be presented within a portion of the failure notification 1100. For example, the failure notification 1100 may be presented as a bubble, window, or pop-up. The failure notification 1100 includes text or graphical information indicating failure to identify a network location 610, failure to receive a response, or an indication of a plurality of network locations 610 having been identified and the link field 1110 to input a desired network location 610.

Figure 12:
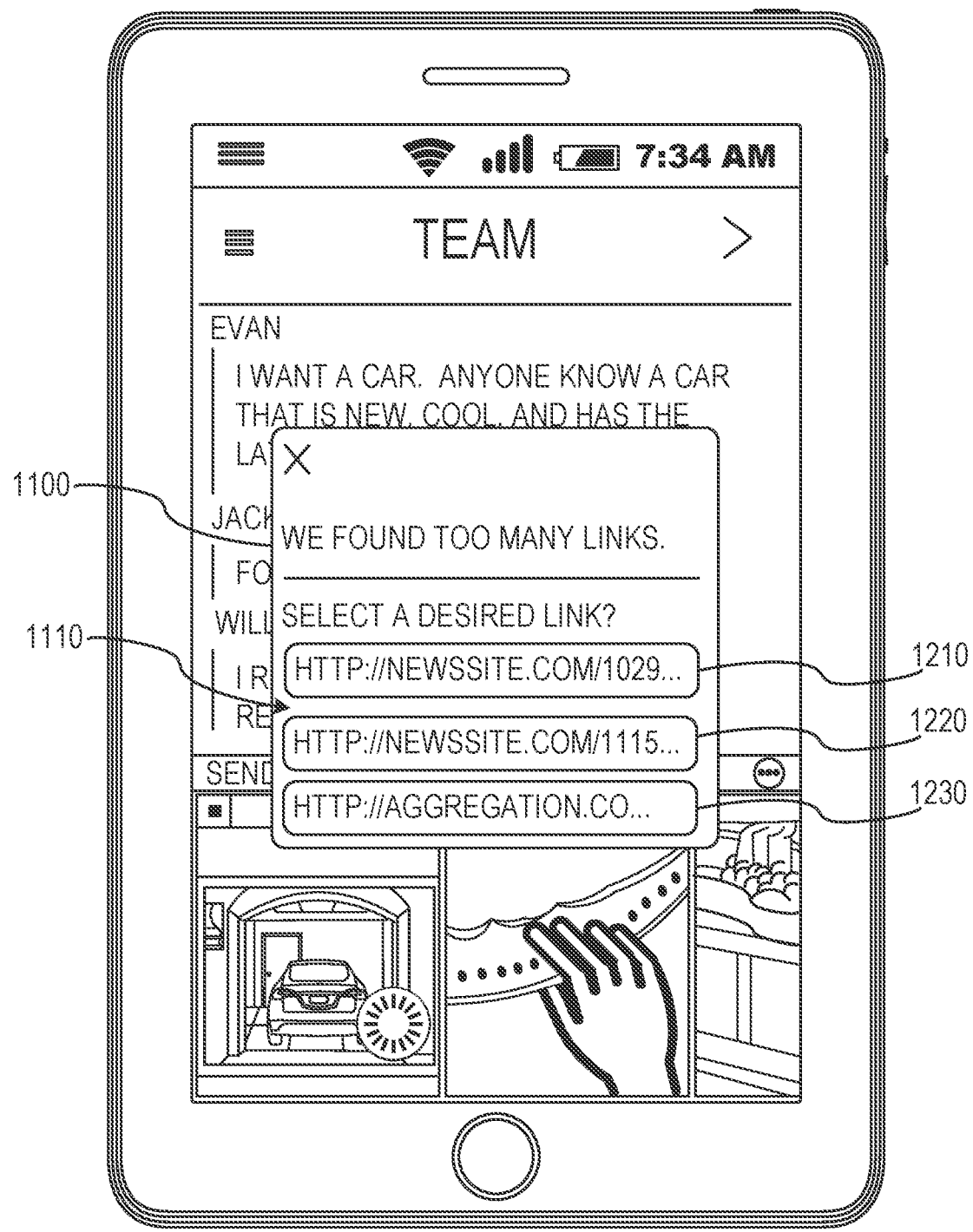
FIG. 12 illustrates an example presentation of a failure notification, according to some example embodiments.

The link field 1110 is a user interface element capable of receiving a network location 610 (e.g., a URL or a web address). The link field 1110 may be a text entry field 1120, as shown in FIG. 11; one or more selectable user interface elements 1210-1230, as shown in FIG. 12; any suitable field, or combinations thereof. Where the link field 1110 is a text entry field 1120, in some instances, a portion of the text entry field 1120 may be prepopulated to include a common portion of a network location 610 (e.g., a portion of a web address). Alphanumeric input within the text entry field 1120, in the form of a network location 610, causes the presentation module 220 to pass the input network location 610 to the linking module 230. Where the link field 1110 is one or more selectable user interface elements 1210-1230, each user interface element 1210-1230 may include an indication of a single network location 610 which may be associated with the first image 620. In these embodiments, each user interface element 1210-1230 presents at least a portion of the network location 610 associated with the user interface element and includes coding, instructions, or data representing the network location 610. Selection of a user interface element for a specified network location 610 causes the presentation module 220 to pass the specified network location 610 to the linking module 230.

In operation 1030, the linking module 230 receives a network location 610 via the link field 1110. Receiving the network location 610 triggers the linking module 230 to associate the network location 610 with the first image 620, as described above with respect to the methods 300 and 800.

Figure 13:
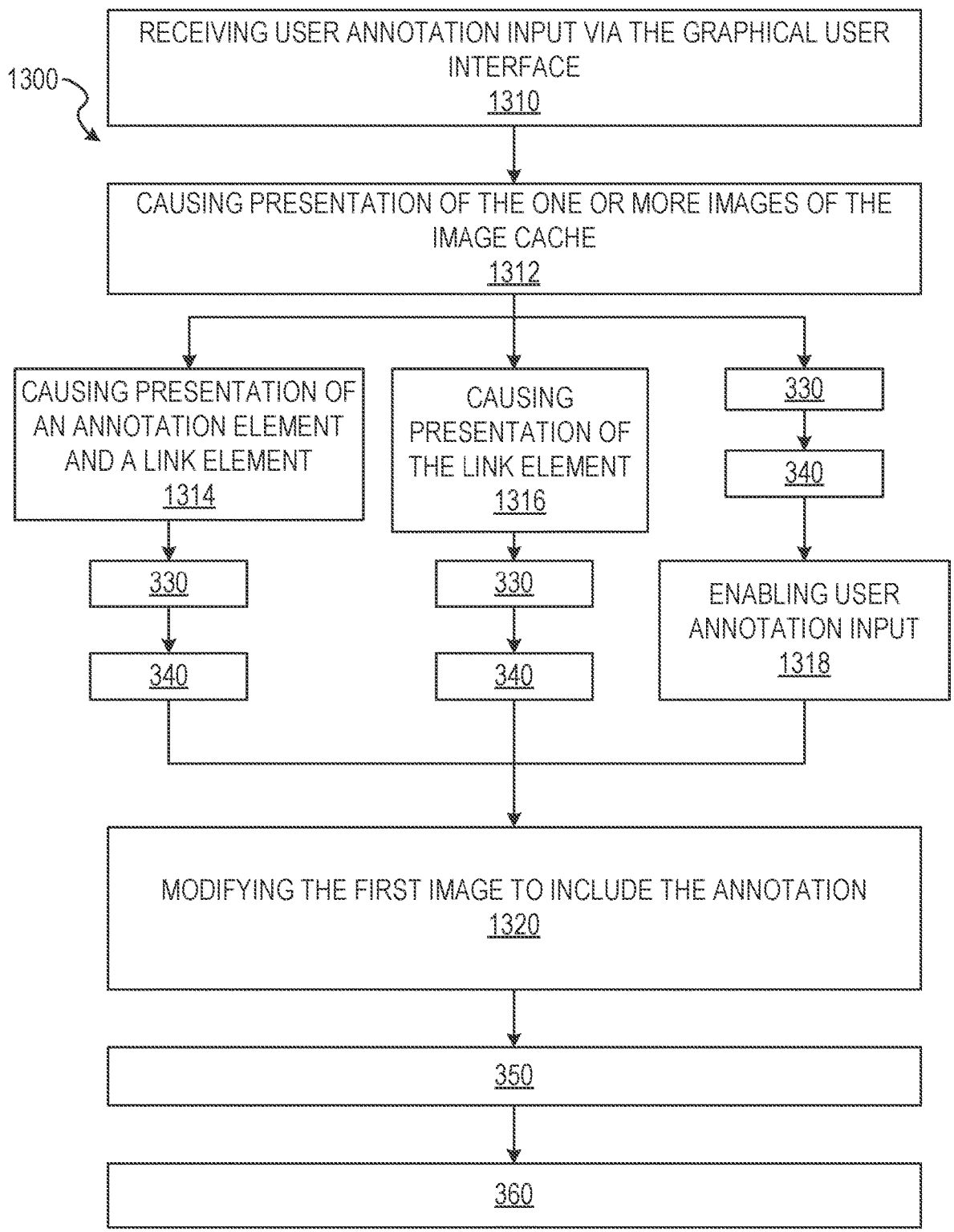
FIG. 13 is a flow diagram illustrating an example method for automatically applying annotation to an image acting as a portion of message content and linking a network resource location to the annotated image within a graphical user interface, according to some example embodiments.
Figure 14:
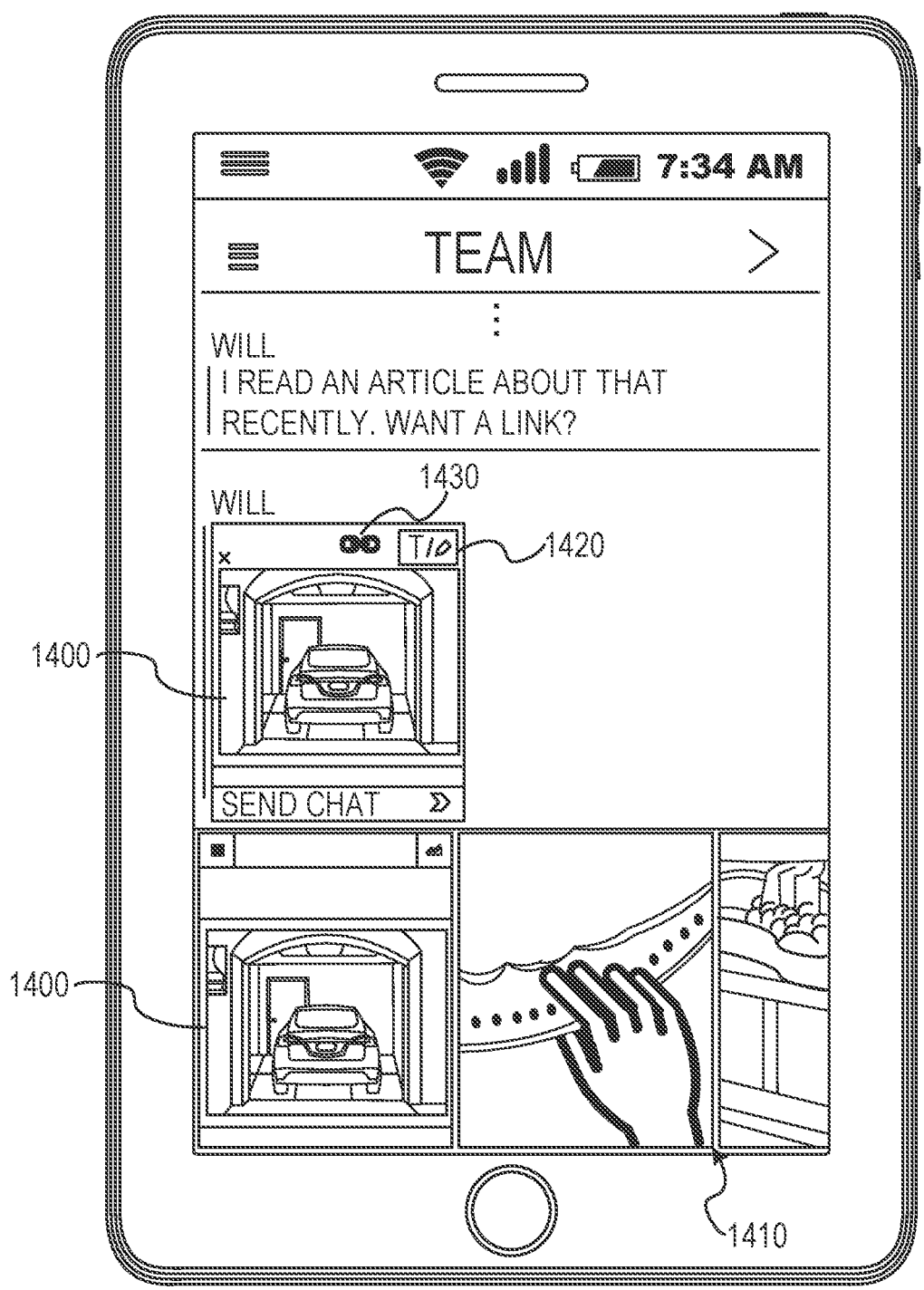
FIG. 14 illustrates an example presentation of a selected image for annotation and linking within a draft message, according to some example embodiments.

FIG. 13 depicts a flow diagram illustrating an example method 1300 for automatically applying annotation to an image acting as a portion of message content and linking a network resource location to the annotated image within a graphical user interface 410. The operations of method 1300 may be performed by components of the communications linking system 160. In some instances, certain operations of the method 1300 may be performed using one or more operations of the methods 300, 800, 900 or 1000, in one or more of the described embodiments, or as sub-operations of one or more operations of the methods 300, 800, 900, or 1000, as will be explained in more detail below.

In operation 1310, the interface module 260 receives user input via the graphical user interface 410. The user input comprises an annotation to be added to the image. In various embodiments, the operation 1310 comprises one or more sub-operations. In operation 1312, the presentation module 220 causes presentation of the one or more images 730 of the image cache. In some instances, the operation 1312 may be performed similarly or the same as the operation 320. The presentation module 220 presents the one or more images 730 as selectable user interface elements 510.

Upon selection of the first image 1400, from the one or more user interface elements 1410, in operation 1314, the presentation module 220 causes presentation of an annotation element 1420 and a link element 1430, as shown in FIG.

14. Selection of the annotation element 1420 enables annotation of the first image 1400. In some embodiments, annotation includes writing over, highlighting, drawing over, applying image filters, or any other modification to the first image 1400. In some instances, selection of the annotation element 1420 causes the interface module 260 to generate an annotation image layer (e.g., an image layer) over the first image 1400, such that annotation of the first image 1400 modifies the annotation image layer. Selection of the link element 1430 may cause one or more of the messaging module 250 and the linking module 230 to identify and link the network location 610 to the first image 1400, as described above with respect to the methods 300 and 800.

In some instances, upon selection of the first image 1400 from the one or more user interface elements 1410, in operation 1316, the presentation module 220 causes presentation of the link element 1430. The interface module 260 interprets an additional selection (e.g., click, touch, or tap) as an annotation command. As in the operation 1314, the additional selection of the presented first image 1400 enables annotation of the image or an image layer generated above the image to produce an annotated first image. Selection of the link element 1430 causes one or more of the messaging module 250 and the linking module 230 to identify and link the network location 610 the annotated first image.

In various example embodiments, in operation 1318, the interface module 260 enables user input for annotating the first image 1400 after one or more of the messaging module 250 and the linking module 230 identify and link the network location 610 to the first image 1400. The interface module 260 may prevent user interaction with the first image 1400, after its initial selection from the one or more images 730 of the image cache, until the linking module 230 links the network location 610 to the first image 1400. After linking, the linking module 230 may trigger the interface module 260 to enable annotation of the first image 1400, as described above.

In operation 1320, the interface module 260 modifies the image to include the annotation. As described above, with respect to the operations 1314, 1316, and 1318, the interface module 260 receives user interactions representing one or more annotation operations (e.g., writing, highlighting, drawing, cropping, rotating, filtering). Based on the user interactions, the interface module 260 may pass the modifications or an indication of the modifications (e.g., an aggregate effect of the user interactions) to the presentation module 220. The presentation module 220 generates an annotated first image and causes presentation of the annotated first image within the graphical user interface 410.

In various embodiments, after causing presentation of the annotated first image, the method 1300 may be completed using operations of one or more of the methods 300, 800, and 900. For example, after generating and presenting the annotated first image and linking the annotated first image with the network location 610, the messaging module 250 may transmit the annotated and linked first image 1400 from the client device 110 to another device, as described with respect to the operations 360 or 940.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner.

In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via appropriate interfaces (e.g., an application program interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 15:
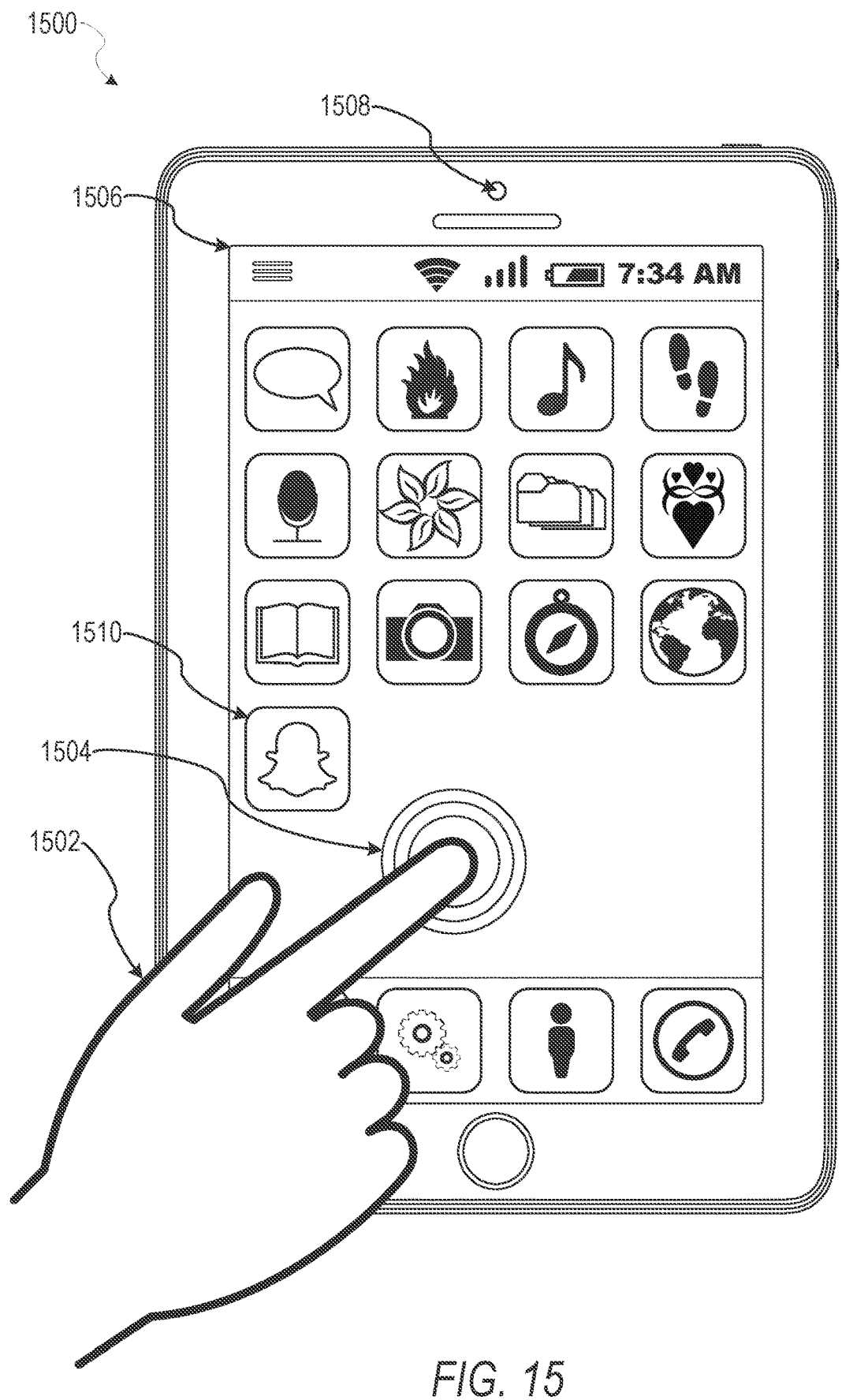
FIG. 15 is a user interface diagram depicting an example mobile device and mobile operating system interface, according to some example embodiments.

FIG. 15 illustrates an example mobile device 1500 executing a mobile operating system (e.g., IOS™, ANDROID™, WINDOWS® Phone, or other mobile operating systems), consistent with some embodiments. In one embodiment, the mobile device 1500 includes a touch screen operable to receive tactile data from a user 1502. For instance, the user 1502 may physically touch 1504 the mobile device 1500, and in response to the touch 1504, the mobile device 1500 may determine tactile data such as touch location, touch force, or gesture motion. In various example embodiments, the mobile device 1500 displays a home screen 1506 (e.g., Springboard on IOS™) operable to launch applications or otherwise manage various aspects of the mobile device 1500. In some example embodiments, the home screen 1506 provides status information such as battery life, connectivity, or other hardware statuses. The user 1502 can activate user interface elements by touching an area occupied by a respective user interface element. In this manner, the user 1502 interacts with the applications of the mobile device 1500. For example, touching the area occupied by a particular icon included in the home screen 1506 causes launching of an application corresponding to the particular icon.

The mobile device 1500, as shown in FIG. 15, includes an imaging device 1508. The imaging device 1508 may be a camera or any other device coupled to the mobile device 1500 capable of capturing a video stream or one or more successive images. The imaging device 1508 may be triggered by the communications linking system 160 or a selectable user interface element 510 to initiate capture of an image, a succession of images, or a video stream for processing according to the one or more methods described in the present disclosure. In some instances, the imaging device 1508 may be a single imaging device 1508 while, in other embodiments, the imaging device 1508 is a plurality of imaging devices 1508.

Many varieties of applications (also referred to as "apps") can be executing on the mobile device 1500, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1500 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1500 includes a social messaging app 1510 such as SNAPCHAT® that, consistent with some embodiments, allows users 106 to exchange ephemeral messages that include media content. In this example, the social messaging app 1510 can incorporate aspects of embodiments described herein. For example, in some embodiments, the social messaging application includes an ephemeral gallery of media created by users 106 of the social messaging application. These galleries may consist of videos or pictures posted by a user 106 and made viewable to contacts (i.e., "friends") of the user 106, represented by content icons for associated with a content originator who is included in the contacts. Alternatively, public galleries may be created by administrators (e.g., content originators) of the social messaging application consisting of media from any users 106 of the application (and accessible by all users 106). In yet another embodiment, the social messaging application may include a "magazine" feature which consists of articles and other content generated by publishers (e.g., content originators) on the social messaging application's platform and accessible by any users 106. Similar to the contacts of a user 106 of the social messaging application, the administrators of public galleries and publishers of articles may be represented by content icons or organizations associated with administrators and publishers may be represented by the content icons. Any of these environments or platforms may be used to implement concepts of the present disclosure, including, e.g., dynamic presentation of user interface elements using differing organizational schemes in response to user input.

In some embodiments, an ephemeral message system may include messages having ephemeral video clips or images which are deleted following a deletion trigger event such as a viewing time or viewing completion. In such embodiments, a device may track user interface inputs (e.g., touch-screen interactions) during presentation of an ephemeral message, and may implement any tracking, command, or interface method described herein both as part of a generation of content for an ephemeral message or as part of a user 106 interacting with an ephemeral message.

Software Architecture

Figure 16:
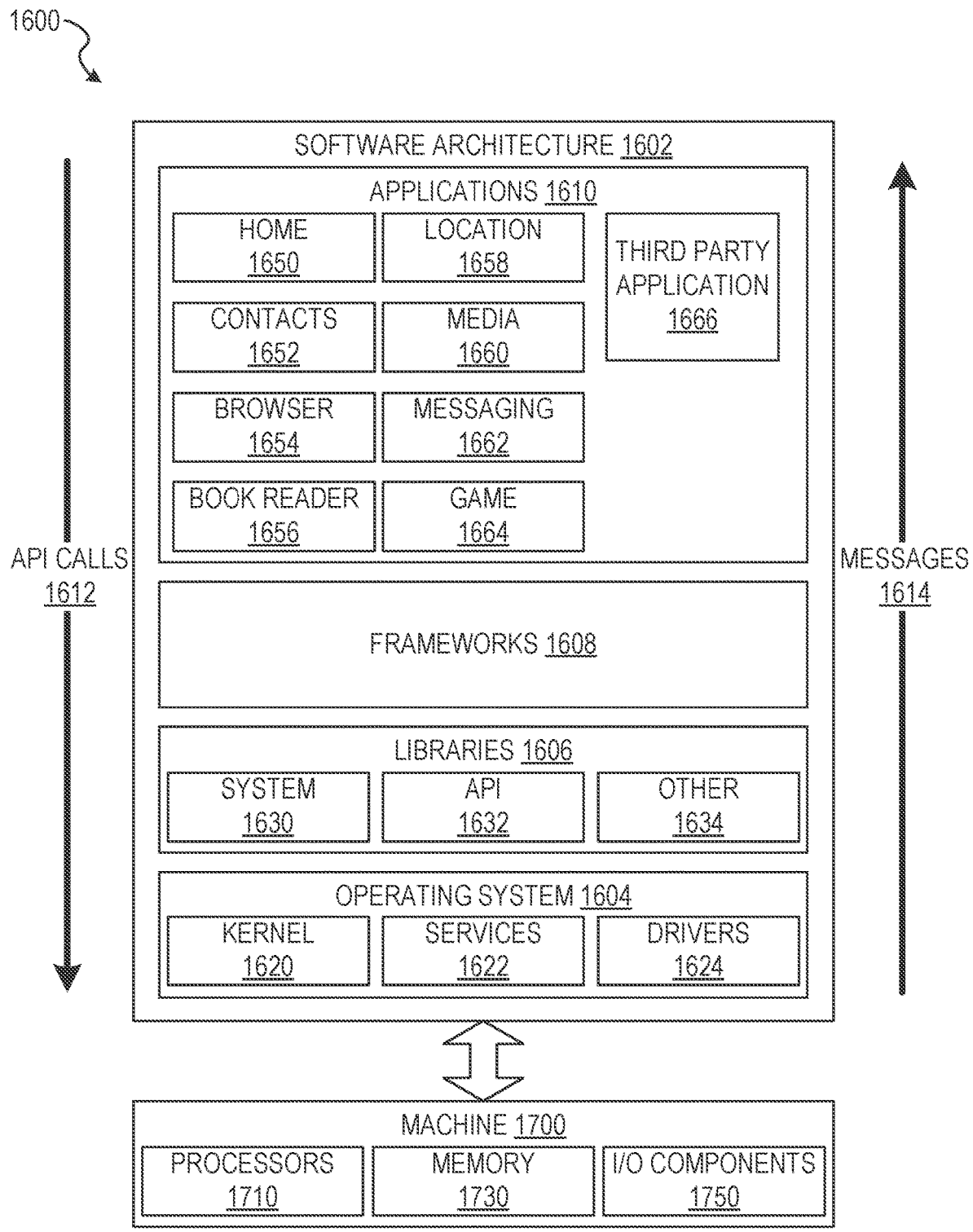
FIG. 16 is a block diagram illustrating an example of a software architecture that may be installed on a machine, according to some example embodiments.

FIG. 16 is a block diagram 1600 illustrating an architecture of software 1602, which can be installed on the devices described above. FIG. 16 is merely a non-limiting example of a software architecture 1602, and it will be appreciated that many other architectures can be implemented to facilitate the functionality described herein. In various embodiments, the software 1602 is implemented by hardware such as machine 1700 of FIG. 17 that includes processors 1710, memory 1730, and I/O components 1750. In this example architecture, the software 1602 can be conceptualized as a stack of layers where each layer may provide a particular functionality. For example, the software 1602 includes layers such as an operating system 1604, libraries 1606, frameworks 1608, and applications 1610. Operationally, the applications 1610 invoke application programming interface (API) calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system 1604 or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third party application 1666. According to some embodiments, the applications 1610 are programs that execute functions defined in the programs. Various programming languages can be employed to create the applications 1610, structured in a variety of manners, such as object-oriented programming languages (e.g., Objective-C, Java, or C++) or procedural programming languages (e.g., C or assembly language). In a specific example, the third party application 1666 (e.g., an application developed using the ANDROID™ or IOS™ software development kit (SDK) by an entity other than the vendor of the particular platform) may be mobile software running on a mobile operating system such as IOS™, ANDROID™ WINDOWS® PHONE, or another mobile operating systems. In this example, the third party application 1666 can invoke the API calls 1612 provided by the operating system 1604 to facilitate functionality described herein.

Example Machine Architecture and Machine-Readable Medium

Figure 17:
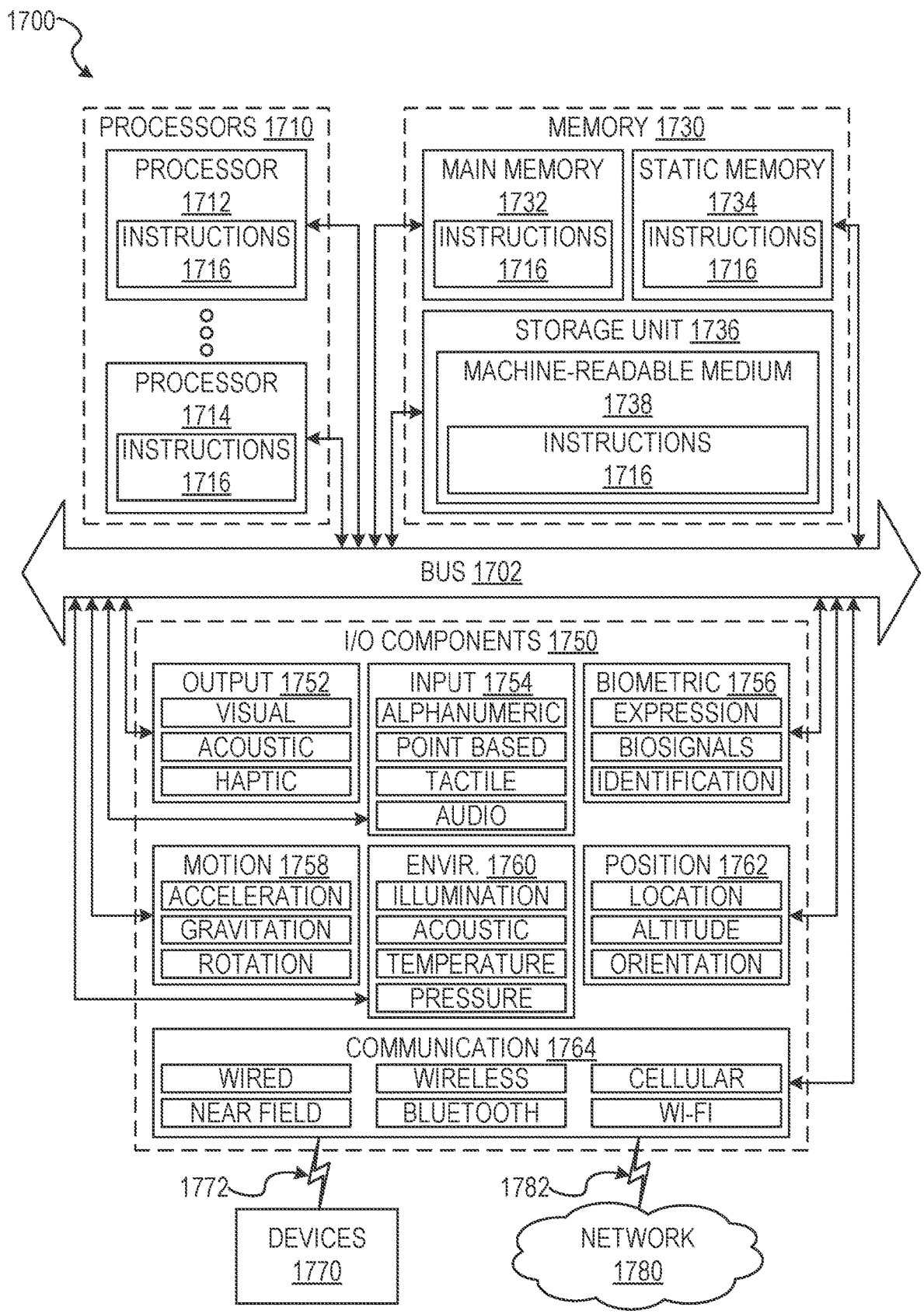
FIG. 17 is a block diagram presenting a diagrammatic representation of a machine in the form of a computer system within which a set of instructions may be executed for causing the machine to perform any of the methodologies discussed herein, according to an example embodiment.

FIG. 17 is a block diagram illustrating components of a machine 1700, according to some embodiments, able to read instructions from a machine-readable medium (e.g., a machine-readable storage medium) and perform any of the methodologies discussed herein. Specifically, FIG. 17 shows a diagrammatic representation of the machine 1700 in the example form of a computer system, within which instructions 1716 (e.g., software, a program, an application, an applet, an app, or other executable code), for causing the machine 1700 to perform any of the methodologies discussed herein, can be executed. In alternative embodiments, the machine 1700 operates as a standalone device or can be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device 1500, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any of the methodologies discussed herein.

In various embodiments, the machine 1700 comprises processors 1710, memory 1730, and I/O components 1750, which can be configured to communicate with each other via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) includes, for example, a processor 1712 and a processor 1714 that may execute the instructions 1716. The term "processor" is intended to include multi-core processors 1710 that may comprise two or more independent processors 1712, 1714 (also referred to as "cores") that can execute instructions 1716 contemporaneously. Although FIG. 17 shows multiple processors 1710, the machine 1700 may include a single processor 1712 with a single core, a single processor 1712 with multiple cores (e.g., a multi-core processor 1712), multiple processors 1712, 1714 with a single core, multiple processors 1712, 1714 with multiples cores, or any combination thereof.

The memory 1730 comprises a main memory 1732, a static memory 1734, and a storage unit 1736 accessible to the processors 1710 via the bus 1702, according to some embodiments. The storage unit 1736 can include a machine-readable medium 1738 on which are stored the instructions 1716 embodying any of the methodologies or functions described herein. The instructions 1716 can also reside, completely or at least partially, within the main memory 1732, within the static memory 1734, within at least one of the processors 1710 (e.g., within the processor's cache memory), or any suitable combination thereof, during execution thereof by the machine 1700. Accordingly, in various embodiments, the main memory 1732, the static memory 1734, and the processors 1710 are considered machine-readable media 1738.

As used herein, the term "memory" refers to a machine-readable medium 1738 able to store data temporarily or permanently and may be taken to include, but not be limited to, random-access memory (RAM), read-only memory (ROM), buffer memory, flash memory, and cache memory. While the machine-readable medium 1738 is shown, in an example embodiment, to be a single medium, the term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions 1716, when executed by processors of the machine 1700 (e.g., processors 1710), cause the machine 1700 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. In general, it will be appreciated that the I/O components 1750 can include many other components that are not shown in FIG. 17. The I/O components 1750 are grouped according to functionality merely for simplifying the following discussion, and the grouping is in no way limiting. In various example embodiments, the I/O components 1750 include output components 1752 and input components 1754. The output components 1752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches 1504 or touch gestures, or other tactile input components), audio input components (e.g., a microphone), and the like.

In some further example embodiments, the I/O components 1750 include biometric components 1756, motion components 1758, environmental components 1760, or position components 1762, among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 include a network interface component or another suitable device to interface with the network 1780. In further examples, communication components 1764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1770 may be another machine 1700 or any of a wide variety of peripheral devices (e.g., a peripheral device coupled via a Universal Serial Bus (USB)).

Moreover, in some embodiments, the communication components 1764 detect identifiers or include components operable to detect identifiers. For example, the communication components 1764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1764, such as location via Internet Protocol (IP) geo-location, location via WI-FI® signal triangulation, location via detecting a BLU-ETOOTH® or NFC beacon signal that may indicate a particular location, and so forth.

Transmission Medium

In various example embodiments, portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Furthermore, the machine-readable medium 1738 is a non-transitory machine-readable storage medium (in other words, not having any transitory signals) in that it does not embody a propagating signal. However, labeling the machine-readable medium 1738 "non-transitory" should not be construed to mean that the medium is incapable of movement; the medium should be considered as being transportable from one physical location to another. Additionally, since the machine-readable medium 1738 is tangible, the medium may be considered to be a machine-readable device.

LANGUAGE

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   accessing an image cache of a computing device;
   causing presentation of an image of the image cache within a graphical user interface of a messaging application, the messaging application displaying a message thread on the computing device;
   determining, at the computing device, a set of search terms from the image of the image cache;

based on a search using the set of search terms, attempting to identify a network location that contains the set of search terms;
receiving a set of network locations for the search, the set of network locations satisfying the set of search terms;
in response to failing to identify the network location based on the set of network locations lacking the image:
causing presentation of a failure notification within the graphical user interface of the computing device;
causing presentation of a linked field based on the presentation of the failure notification, the linked field comprising a set of selectable user interface elements for the set of network locations returned for the search; and
receiving a network location via the linked field;
linking the network location to the image to generate a linked image, the generating of the linked image causing modification of the image to include a representation of the network location; and
causing presentation of the linked image within a draft message within the graphical user interface.

2. The method of claim 1, wherein the image is a screen capture of a second image presented within the graphical user interface of the computing device and the network location is a network address.

3. The method of claim 1, wherein the image is captured via an image device coupled to the computing device.

4. The method of claim 1, wherein the image is presented as a user interface element, the method further comprising:
detecting a selection, of the user interface element; and
based on the selection of the user interface element, transmitting the image to an image identification system via a communication network.

5. The method of claim 1, further comprising:
transmitting the image to an image identification system via a communication network based on the presentation of the image of the image cache.

6. The method of claim 1, further comprising:
causing presentation of a linking indicator based on the presentation of the image of the image cache.

7. The method of claim 1, wherein linking the network location to the image further comprises:
generating an overlay element representing the network location, the overlay element comprising a selectable user interface element and an indication of the network location; and
associating the overlay element with the image.

8. The method of claim 1, wherein linking the network location to the image to generate the linked image further comprises:
storing the network location in metadata associated with the image.

9. The method of claim 1, further comprising:
receiving a second network location for a network resource for a second image;
detecting a failure to link the second network location to the second image based on a monitored condition;
causing presentation of a second failure notification, the second failure notification indicating the failure to link the second network location to the second image;
based on presenting the second failure notification, causing presentation of a link field; and
receiving the second network location via the link field.

10. The method of claim 1, further comprising:
receiving input via the graphical user interface, the input comprising an annotation to be added to the image; and
modifying the image to include the annotation.

11. A system, comprising:
a memory that stores instructions; and
one or more processors configured by the instructions to perform operations comprising:
accessing an image cache of a computing device;
causing presentation of an image of the image cache within a graphical user interface of a messaging application, the messaging application displaying a message thread on the computing device;
determining, at the computing device, a set of search terms from the image of the image cache;
based on a search using the set of search terms, attempting to identify a network location that contains the set of search terms;
receiving a set of network locations for the search, the set of network locations satisfying the set of search terms;
in response to failing to identify the network location based on the set of network locations lacking the image:
causing presentation of a failure notification within the graphical user interface of the computing device;
causing presentation of a linked field based on the presentation of the failure notification, the linked field comprising a set of selectable user interface elements for the set of network locations returned for the search; and
receiving a network location via the linked field;
linking the network location to the image to generate a linked image, the generating of the linked image causing modification of the image to include a representation of the network location; and
causing presentation of the linked image within a draft message within the graphical user interface.

12. The system of claim 11, wherein the image is a screen capture of a second image presented within the graphical user interface of the computing device and the network location is a network address.

13. The system of claim 11, wherein the image is captured via an image device coupled to the computing device.

14. The system of claim 11, wherein the image is presented as a user interface element, the operations further comprising:
detecting a user input, the user input selecting the user interface element; and
based on the selection of the user interface element, transmitting the image to an image identification system via a communication network.

15. The system of claim 11, the operations further comprising:
transmitting the image to an image identification system via a communication network based on the presentation of the image of the image cache.

16. The system of claim 15, the operations further comprising:
causing presentation of a linking indicator based on the presentation of the image of the image cache.

17. The system of claim 15, the operations further comprising:
generating an overlay element representing the network location, the overlay element comprising a selectable user interface element and an indication of the network location; and
associating the overlay element with the image.

18. A non-transitory machine-readable storage medium comprising processor executable instructions that, when executed by a processor of a machine, cause the machine to perform operations comprising:
accessing an image cache of a computing device;
causing presentation of an image of the image cache within a graphical user interface of a messaging application, the messaging application displaying a message thread on the computing device;
determining, at the computing device, a set of search terms from the image of the image cache;
based on a search using the set of search terms, attempting to identify a network location that contains the set of search terms;
receiving a set of network locations for the search, the set of network locations satisfying the set of search terms;
in response to failing to identify the network location based on the set of network locations lacking the image:
causing presentation of a failure notification within the graphical user interface of the computing device;
causing presentation of a linked field based on the presentation of the failure notification, the linked field comprising a set of selectable user interface elements for the set of network locations returned for the search; and
receiving a network location via the linked field;
linking the network location to the image to generate a linked image, the generating of the linked image causing modification of the image to include a representation of the network location; and
causing presentation of the linked image within a draft message within the graphical user interface.

19. The non-transitory machine-readable storage medium of claim 18, wherein the image is a screen capture of a second image presented within the graphical user interface of the computing device and the network location is a network address.

20. The non-transitory machine-readable storage medium of claim 18, wherein the image is captured via an image device coupled to the computing device.

* * * * *